US012789713B2

(12) United States Patent
Kiefer, IV et al.

(10) Patent No.: US 12,789,713 B2
(45) **Date of Patent: *Nov. 10, 2026**

(54) MODULAR MOUNTING SYSTEM WITH REMOVABLE CROSS-BARS AND SIDE PANELS FOR TRUCK BEDS AND THE LIKE

(71) Applicant: N.B. Adventures LLC, Wyomissing, PA (US)

(72) Inventors: William H. Kiefer, IV, Elizabethtown, PA (US); Nathan T. Sutherland, Wyomissing, PA (US)

(73) Assignee: N.B. Adventures LLC, Wyomissing, PA (US)

( * ) Notice: Subject to any disclaimer, the term of this patent is extended or adjusted under 35 U.S.C. 154(b) by 335 days.

This patent is subject to a terminal disclaimer.

(21) Appl. No.: 18/667,138

(22) Filed: May 17, 2024

(65) Prior Publication Data

US 2024/0300417 A1 Sep. 12, 2024

Related U.S. Application Data

(63) Continuation of application No. 17/700,716, filed on Mar. 22, 2022, now Pat. No. 12,291,171, which is a (Continued)

(51) Int. Cl.

*B60R 9/06* (2006.01)
*B60R 9/10* (2006.01)
*B60R 9/12* (2006.01)

(52) U.S. Cl.

CPC *B60R 9/06* (2013.01); *B60R 9/10* (2013.01); *B60R 9/12* (2013.01)

(58) Field of Classification Search

CPC ........ B60R 9/06

See application file for complete search history.

(56) References Cited

U.S. PATENT DOCUMENTS 4,938,493 A 7/1990 Okuda
5,197,642 A 3/1993 Cortelli
(Continued)

OTHER PUBLICATIONS

Office Action dated Jul. 25, 2024, issued in counterpart CA Application No. 3,154,329 (5 pages).
(Continued)

*Primary Examiner* — Brian D Nash
(74) *Attorney, Agent, or Firm* — WHDA, LLP

(57) ABSTRACT

According to some illustrative embodiments, a modular mounting system for mounting accessories on vehicles includes: a) a plurality of support members, each of said plurality of support members having i) a lower upright planar member configured to extend downward along a peripheral wall around a vehicle bed, ii) a cross planar member extending laterally from the lower upright planar member and configured to extend across the peripheral wall around the vehicle bed, and iii) an upper upright planar member extending upwardly from the cross planar member and configured to extend upwardly above a height of the peripheral wall around the vehicle bed; and b) at least one of: i) a removable cross-bar removably supported by a plurality of said upper upright planar members; and ii) a removable side panel removably supported by a plurality of said upright planar members.

34 Claims, 22 Drawing Sheets

Related U.S. Application Data continuation-in-part of application No. 17/522,893, filed on Nov. 9, 2021, now Pat. No. 11,891,124.

(60) Provisional application No. 63/172,647, filed on Apr. 8, 2021.

(56) References Cited

U.S. PATENT DOCUMENTS

| | | | | |
|---|---|---|---|---|
| 5,560,576 | A | 10/1996 | Cargill | |
| 5,741,038 | A | 4/1998 | Fowler et al. | |
| 5,836,490 | A | 11/1998 | Price | |
| 6,039,520 | A | 3/2000 | Cheng | |
| 6,059,159 | A | 5/2000 | Fisher | |
| 6,196,602 | B1 | 3/2001 | Esplin | |
| 6,270,301 | B1 | 8/2001 | Dunlop | |
| 6,350,089 | B1 | 2/2002 | Tekavec | |
| 6,632,055 | B2 * | 10/2003 | Kania | B60P 3/40 410/38 |
| 6,834,786 | B2 | 12/2004 | Hansen | |
| 6,848,873 | B1 | 2/2005 | Husk | |
| 6,913,175 | B2 | 7/2005 | Martin | |
| 7,497,493 | B1 | 3/2009 | Thiessen et al. | |
| 8,016,528 | B2 * | 9/2011 | Kmita | B60P 7/14 410/139 |
| 8,668,125 | B2 | 3/2014 | Williams | |
| 8,857,880 | B2 | 10/2014 | Kalergis et al. | |
| 9,017,004 | B1 | 4/2015 | Brown, Jr. et al. | |
| 9,120,415 | B1 | 9/2015 | Harris | |
| 9,566,914 | B2 | 2/2017 | Marr, Jr. | |
| 9,688,127 | B2 * | 6/2017 | Hemphill | B60J 7/104 |
| 10,207,650 | B1 | 2/2019 | Banegas | |
| 10,279,725 | B2 * | 5/2019 | Wilson | B60R 13/04 |
| 10,800,231 | B2 * | 10/2020 | Bernardo | B60J 7/085 |
| 10,850,676 | B1 | 12/2020 | Worker | |
| 10,919,369 | B2 * | 2/2021 | Lewis | B60J 7/104 |
| 11,034,307 | B1 | 6/2021 | Cunningham | |
| 11,130,437 | B1 | 9/2021 | Tatro | |
| 11,142,905 | B2 * | 10/2021 | Kelly | E04B 5/046 |
| 11,305,824 | B1 | 4/2022 | Schellens | |
| 11,433,841 | B2 | 9/2022 | Nava Reyes | |
| 11,459,038 | B2 | 10/2022 | Schuling | |
| 11,654,978 | B2 * | 5/2023 | Smith | B60R 9/06 224/405 |
| 11,679,709 | B2 | 6/2023 | Salter et al. | |
| 11,787,347 | B1 | 10/2023 | Dunham | |
| 2001/0040139 | A1 | 11/2001 | Dean et al. | |
| 2007/0207004 | A1 * | 9/2007 | Silamianos | B60P 7/14 410/130 |
| 2008/0143133 | A1 | 6/2008 | Nichols | |
| 2014/0034696 | A1 | 2/2014 | Marr et al. | |
| 2014/0191527 | A1 | 7/2014 | Riley | |
| 2014/0305978 | A1 | 10/2014 | Austrie | |
| 2015/0183363 | A1 | 7/2015 | Puchkoff | |
| 2016/0059906 | A1 | 3/2016 | Leitner | |
| 2018/0111542 | A1 | 4/2018 | Mueller | |
| 2019/0367101 | A1 | 12/2019 | McFadden et al. | |
| 2019/0381959 | A1 | 12/2019 | Maynard et al. | |
| 2020/0031289 | A1 | 1/2020 | Williams | |
| 2020/0148280 | A1 | 5/2020 | Elder et al. | |
| 2021/0078501 | A1 | 3/2021 | Lorenzo | |
| 2022/0177053 | A1 | 6/2022 | Green et al. | |
| 2022/0219765 | A1 | 7/2022 | Reyes | |
| 2022/0324391 | A1 | 10/2022 | Kiefer, IV et al. | |
| 2023/0108330 | A1 | 4/2023 | Azzam et al. | |

OTHER PUBLICATIONS

Kayak USA, "New Bed Rack System, Full Install and Why I Switched . . . Overlander Build", https://www.youtube.com/watch?v=F3UtnyZuZBM, Oct. 23, 2020 (Oct. 23, 2020), retrieved on Jul. 3, 2024.

Notice of Allowance dated Jan. 2, 2025, issued in U.S. Appl. No. 17/579,893 (9 pages).

Macia, Will, "KB Voodoo Fab Bed Racks", Overland Bound Community, Aug. 11, 2017, web site: <https://www.overlandbound.com/forums/threads/kb-voodoo-fab-bed-racks.9091/> retrieved date Apr. 27, 2022 (14 pages).

"Toyota Tacoma Hi Rise Crossbars, for Use With Tonneau Covers—KB Voodoo Fabrications", Nov. 12, 2020, web site: <https://web.archive.org/web/20201112013853/https://www.kbvoodoo.com/shop/toyota-tacoma-hi-rise-crossbars-for-use-with-tonneau-covers-fits-years-2005-2016> retrieved date Apr. 27, 2022 (10 pages).

Non-Final Office Action dated Jun. 7, 2023, issued in U.S. Appl. No. 17/522,893 (12 pages).

Office Action dated Jul. 27, 2023, issued in CA application No. 3,154,329 (10 pages).

KB Voodoo, "KB Voodoo Hi Rise Crossbars, for use with tonneau covers Ready to Ship", website: https://www.tacomaworld.com/threads/kb-voodoo-hi-rise-crossbars-for-use-with-tonneau-covers-ready-to-ship.418409/page-3, Mar. 12, 2016, cited in CA Office Action dated Jul. 27, 2023. (13 pages).

Notice of Allowance dated Oct. 12, 2023, issued in U.S. Appl. No. 17/522,893 (6 pages).

Non-final Office Action dated Oct. 25, 2024, issued in U.S. Appl. No. 17/700,716 (13 pages).

Non-final Office Action dated Jul. 9, 2024, issued in U.S. Appl. No. 17/700,716 (6 pages).

Notice of Allowance dated Aug. 30, 2024, issued in U.S. Appl. No. 17/700,716 (6 pages).

Non-final Office Action dated Jun. 12, 2024, issued in U.S. Appl. No. 17/579,893 (6 pages).

* cited by examiner

MODULAR MOUNTING SYSTEM WITH REMOVABLE CROSS-BARS AND SIDE PANELS FOR TRUCK BEDS AND THE LIKE

The present application is a continuation of U.S. application Ser. No. 17/700,716, filed Mar. 22, 2022, which is a continuation-in-part of U.S. application Ser. No. 17/522,893, filed Nov. 9, 2021, now U.S. Pat. No. 11,891,124, issued on Feb. 6, 2024, which is a non-provisional application of U.S. provisional application Ser. No. 63/172,647, filed Apr. 8, 2021, the entire disclosures of which are incorporated herein by reference.

BACKGROUND

The present invention relates to systems and methods for mounting accessories and the like to vehicles, and the preferred embodiments relate to systems and methods for mounting accessories and the like to truck beds and the like.

SUMMARY

The preferred embodiments overcome shortcomings in the above and/or other background art.

According to some embodiments, a modular mounting system for mounting accessories on vehicles is provided that includes: a) a plurality of support members, each of the plurality of support members having a lower section configured to attach to an upper region of a peripheral wall around a vehicle bed at a height below a tonneau cover that extends over the vehicle bed and having an upper section extending to a height above the tonneau cover for support of accessories at a location above the tonneau cover, the support members being configured to allow operation of the tonneau cover without interfering with operation of the tonneau cover; and b) at least one of: i) a removable cross-bar removably supported by a plurality of the upper sections of the plurality of support members; and ii) a removable side panel removably supported by a plurality of the upper sections of the plurality of support members.

In some embodiments, the support members are formed by bent plate members. In some embodiments, the support members are molded members. In some embodiments, the support members are made of plastic or composite materials. In some embodiments, the support members are made of metal.

In some embodiments, the support members include a brace attached to an upper section of the support member. In some embodiments, the brace includes a lower support surface for supporting the removable cross-bars and at least one upwardly extending lateral support surface for fixing a location of the removable cross-bars. In some embodiments, the brace has two upwardly extending lateral support surfaces. In some embodiments, the brace forms a substantially U-shaped member having an open top end. In some embodiments, the brace has a top surface. In some embodiments, the brace is a single shaped piece or the brace is two or more separate pieces. In some embodiments, the brace is made with metal, molded plastics or composites. In some embodiments, the brace is made from welded construction.

According to some embodiments, a modular mounting system for mounting accessories on vehicles is provided that includes: a) a plurality of support members, each of the plurality of support members having i) a lower upright planar member configured to extend downward along a peripheral wall around a vehicle bed, ii) a cross planar member extending laterally from the lower upright planar member and configured to extend across the peripheral wall around the vehicle bed, and iii) an upper upright planar member extending upwardly from the cross planar member and configured to extend upwardly above a height of the peripheral wall around the vehicle bed; b) at least one of: i) a removable cross-bar removably supported by a plurality of the upper upright planar members; and ii) a removable side panel removably supported by a plurality of the upright planar members.

In some embodiments, the system includes each of i) the removable cross-bar removably supported by a plurality of the upper upright planar members and ii) the removable side panel removably supported by a plurality of the upright planar members. In some embodiments, the removable cross-bar and the removable side panel are both supported by the same plurality of the upper upright planar members. In some embodiments, the system includes the removable cross-bar removably supported by a plurality of the upper upright planar members, and wherein the cross-bar is an extruded member. In some embodiments, the system includes the removable cross-bar removably supported by a plurality of the upper upright planar members, and wherein the cross-bar is made with extruded aluminum. In some embodiments, the plurality of support members are made with metal. In some embodiments, the plurality of support members are molded members. In some embodiments, the plurality of support members are made with steel.

In some embodiments, the system further includes at least one of the following mounted on the cross bars:

a) a bicycle or motorcycle;
b) a bicycle or motorcycle rack;
c) lawn or construction equipment;
d) tents or other enclosures for human inhabitation; and/or
e) sporting equipment or sporting equipment mounts.

In some embodiments, the system further includes at least one of the following mounted on the side panel:

a) a hand tool;
b) a firearm;
c) a board;
d) equipment; and/or
e) a container.

According to some other embodiments, a method is performed that includes a method for mounting accessories on vehicles, comprising: a) mounting a plurality of support members on a peripheral wall of a bed of a vehicle, with each of the plurality of support members having i) a lower upright planar member mounted to extend downward along the peripheral wall around a vehicle bed, ii) a cross planar member extending laterally from the lower upright planar member and extending across the peripheral wall around the vehicle bed, and iii) an upper upright planar member extending upwardly from the cross planar member and extending upwardly above a height of the peripheral wall around the vehicle bed; b) providing at least one of: i) a removable cross-bar removably supported by a plurality of the upper upright planar members; and ii) a removable side panel removably supported by a plurality of the upright planar members.

In some embodiments, the method further includes providing each of i) the removable cross-bar removably supported by a plurality of the upper upright planar members and ii) the removable side panel removably supported by a plurality of the upright planar members. In some embodiments, the method further includes supporting the removable cross-bar and the removable side panel by the same plurality of the upper upright planar members. In some embodiments, the method further includes forming the cross-bars by extrusion. In some embodiments, the method further includes forming the cross bars by extruding aluminum. In some embodiments, the method further includes forming the plurality of support members with metal. In some embodiments, the method further includes forming the plurality of support members with steel. In some embodiments, the method further includes forming the plurality of support members as molded members. In some embodiments, the method further includes forming the plurality of support members with molded plastics. In some embodiments, the method further includes forming the plurality of support members with a composite material.

In some embodiments, the method further includes mounting at least one of the following on the cross bars:

a) a bicycle or motorcycle;
b) a bicycle or motorcycle rack;
c) lawn or construction equipment;
d) tents or other enclosures for human inhabitation;
e) a container; and/or
f) sporting equipment or sporting equipment mounts.

In some embodiments, the method further includes, mounting at least one of the following on the side panels:

a) a hand tool;
b) a firearm;
c) a board;
d) equipment; and/or
e) a container.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF DRAWINGS

The preferred embodiments of the present invention are shown by a way of example, and not limitation, in the accompanying figures, in which.

DETAILED DESCRIPTION OF THE PREFERRED EMBODIMENTS OF THE INVENTION

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Illustrative Sizes, Dimensions & Scale in Some Embodiments

Figure 8:
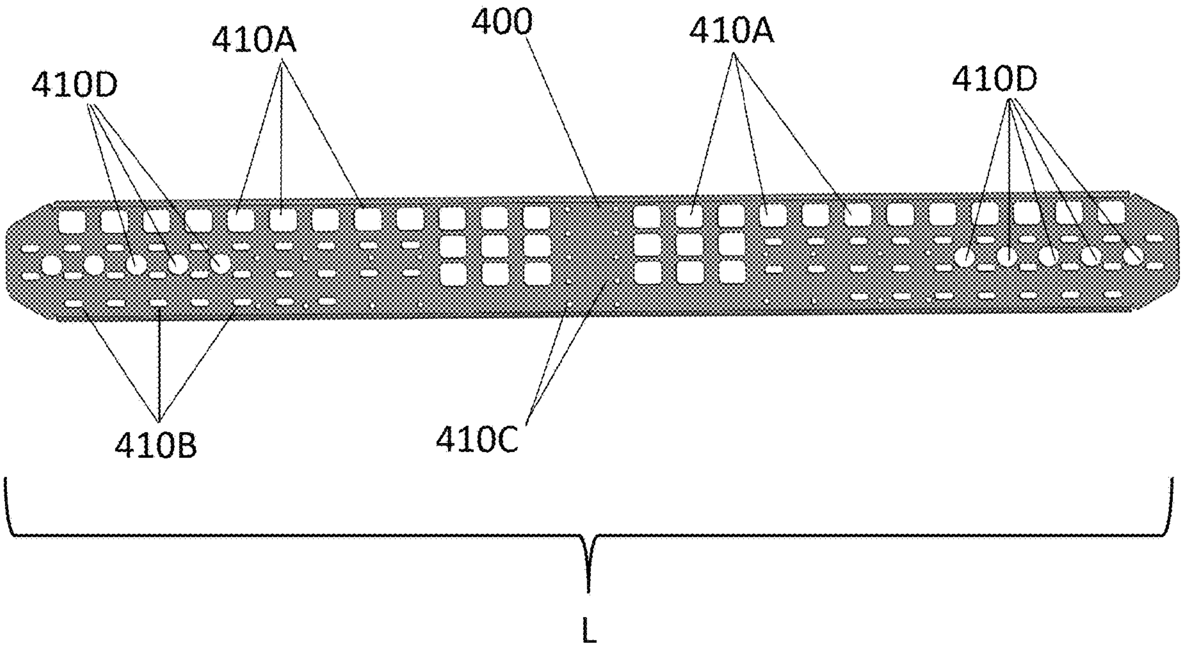
FIG. 8 is a rear side view of the side panel shown in, e.g., FIG. 7.

Although sizes and dimensions of the preferred embodiments can be varied as desired in various embodiments and implementations of the present invention, in some embodiments, the attached figures show illustrative embodiments with the elements illustrated to scale in size and dimensions. For example, in some embodiments, the length L of the side panel is about 52" (52 inches) long, and all other dimensions of openings, etc., can be proportionally sized and arranged as shown. In some alternative embodiments, the length L of the side panel can be between about 28" to 76" long. In some embodiments, the length L can be between about 40" to 64"

long. In some embodiments, the length L can be between about 46" to 58" long. In some embodiments, the various openings can be appropriately dimensioned as shown in FIG. 8, corresponding to a 52" long panel, regardless of the length of the side panel. In some embodiments, the various openings can be proportionally adjusted.

In various embodiments, the sizes, positions and arrangement of openings can be adapted or modified as desired.

In some preferred embodiments, the side panels include an array of openings to facilitate mounting of accessories and the like. In some embodiments, the array of openings includes a variety of shapes and sizes of openings to facilitate mounting of a variety of accessories and the like, including, e.g., substantially rectangular openings (e.g., see 410A in FIG. 8), substantially circular openings (see, e.g., 410D and 410C in FIG. 8), and/or substantially horizontally elongated openings (see, e.g., 410B in FIG. 8).

Illustrative Aspects of the Preferred Embodiments

According to some preferred embodiments, an improved truck bed modular mounting system with removable cross-bed support bars and side panels is provided.

According to some preferred embodiments, the modular mounting system includes unique truck-mounted support members and unique mounting brackets that attach to the truck-mounted support members, and with unique side panels (also referred to herein as molle panels) attached to the mounting brackets. As indicated above, in some preferred embodiments, the side panels are about 52" long. However, in various embodiments, the length can be varied as desired (for example, the length can be as small as about 1 inch or about 2 inches in some embodiments up to many feet long in some embodiments). And, in some preferred embodiments, the side panels are about 5.25" wide (i.e., the height of the side panels when mounted). However, in various embodiments, the width can also be varied as desired (for example, the length can be as small as about 1 inch or about 2 inches in some embodiments up to a few feet wide or more in some embodiments).

Figure 10:
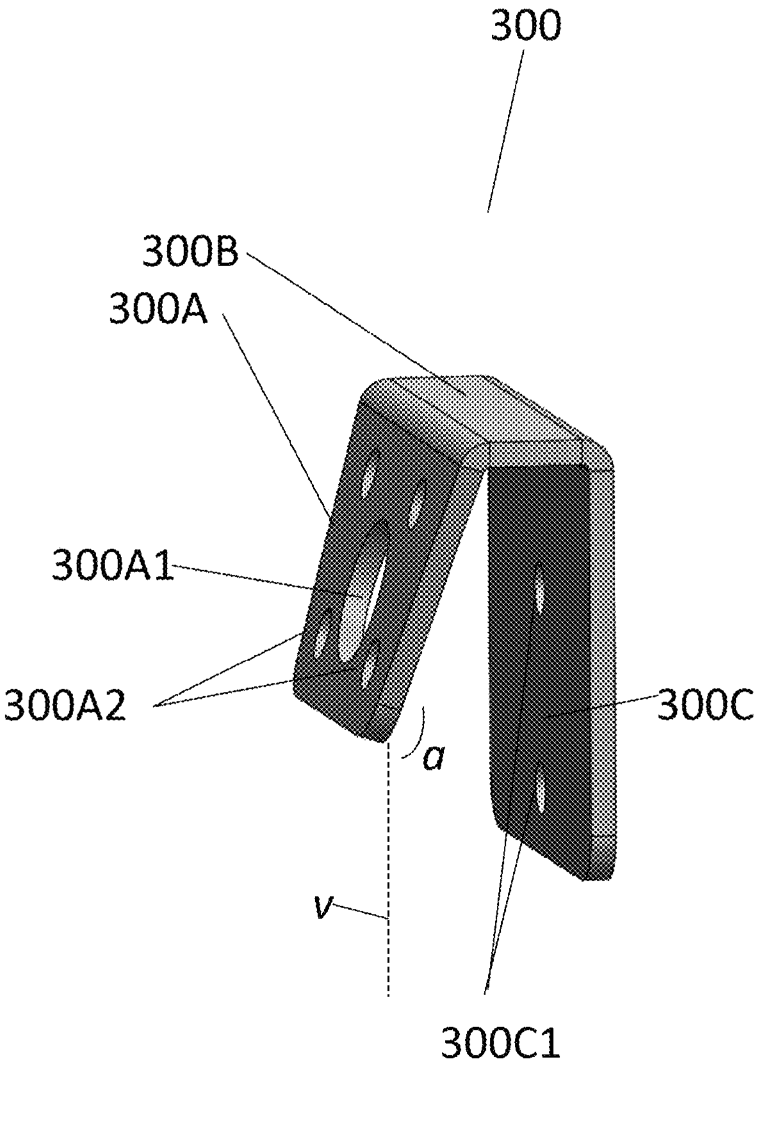
FIG. 10 is a perspective side of the mounting bracket shown in, e.g., FIGS. 4 and 9.
Figure 11:
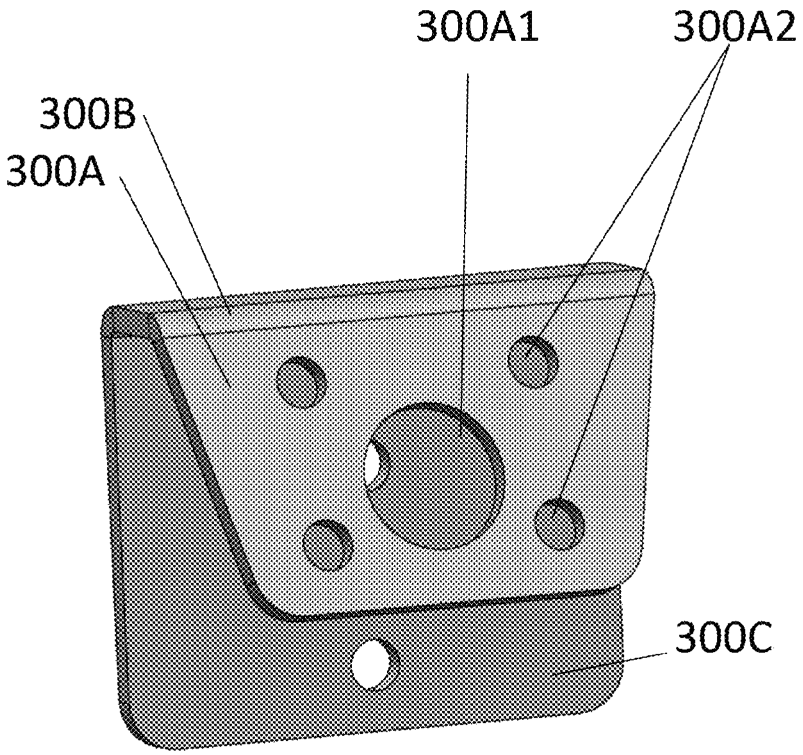
FIG. 11 is a perspective front view of the mounting back shown in FIG. 10.

In the preferred embodiments, the mounting brackets are configured to cause the side panels to tilt or angle inwardly such that the top of the side panel, when mounted, is angled inwardly towards a center of the truck bed. In some preferred embodiments, as shown in FIG. 10, the outer support surface of the mounting bracket is angled at an angle a of about 120 degrees From a vertical line v. In other embodiments, the angle a can be between about 100 to 140 degrees. In other embodiments, the angle a can be between about 90 and 150 degrees. In some other embodiments, the angle a can even be less than 90 degrees. In some preferred embodiments, the angle a is between about 110 and 130 degrees.

In some preferred embodiments, the mounting brackets are made of a rigid material. In some preferred embodiments, the mounting brackets are made of metal. In some preferred embodiments, the mounting brackets are made of steel. In some preferred embodiments, the mounting brackets are made of stainless steel. In some preferred embodiments, the mounting brackets are coated with a protective layer or treated to avoid rusting or corrosion.

In some preferred embodiments, the side panels are made of a rigid material. In some preferred embodiments, the side panels are made of aluminum. In some preferred embodiments, the side panels are coated with a protective layer or treated to avoid rusting or corrosion.

In some preferred embodiments, as described hereinabove, the side panels include an array of holes (e.g., which can be, in some embodiments, drilled or machined into the side panel) that are configured to enable a user to mount or attach accessories or the like to the side panels. For example, in some embodiments, the holes are sized and arranged to enable a user to attach accessories or the like employing bolts, screws, chords, ropes, clips, bungee chords, hooks (such as, e.g., a hook at an end of a bungee chord or rope), and/or other mechanical attachment mechanisms.

Figure 1:
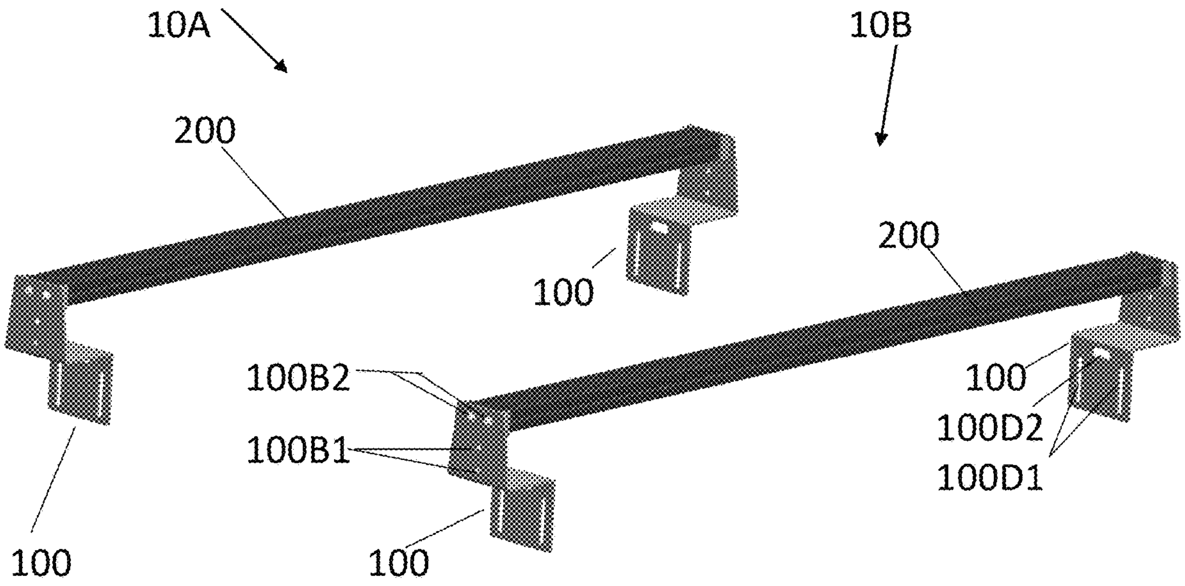
FIG. 1 is perspective view showing a rack structure of a modular mounting system according to some illustrative embodiments of the invention.

As shown in FIG. 1, FIG. 1 is a perspective view showing a rack structure of a modular mounting system according to some illustrative embodiments of the invention.

As shown, the rack structure includes a plurality of rack members 10A and 10B. Although some embodiments could implement a single rack member, and alternative embodiments could implement three rack members, or four rack members or even more rack members, in the preferred embodiments two rack members are employed.

As shown in FIG. 1, each rack member 10A and 10B includes two support members 100 and a cross-bar 200. In operation, the support members 100 are mounted to a vehicle and arranged to support the cross-bar 200.

Figure 9:
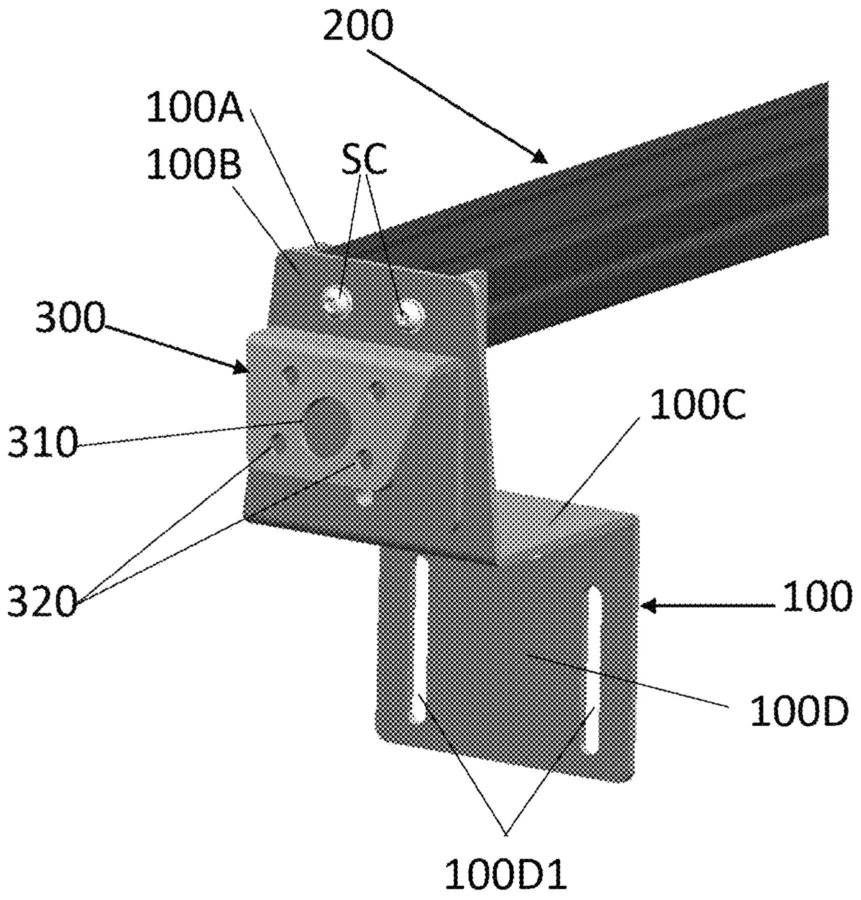
FIG. 9 is a perspective end via of one of the rack structure elements shown in FIG. 1 with a mounting bracket attached.

In the preferred embodiments, the support members 100 are configured two include two substantially upright wall elements that are horizontally offset from one another via a horizontal or transverse cross-element. For example, as shown in, e.g., FIG. 9, in some embodiments, each support member 100 includes a lower upright wall element 100D, that extends downwardly from one end of a horizontal cross-element 100C, and an upper upright wall element 100B that extends upwardly from the other end of the horizontal cross-element 100C.

Figure 2:
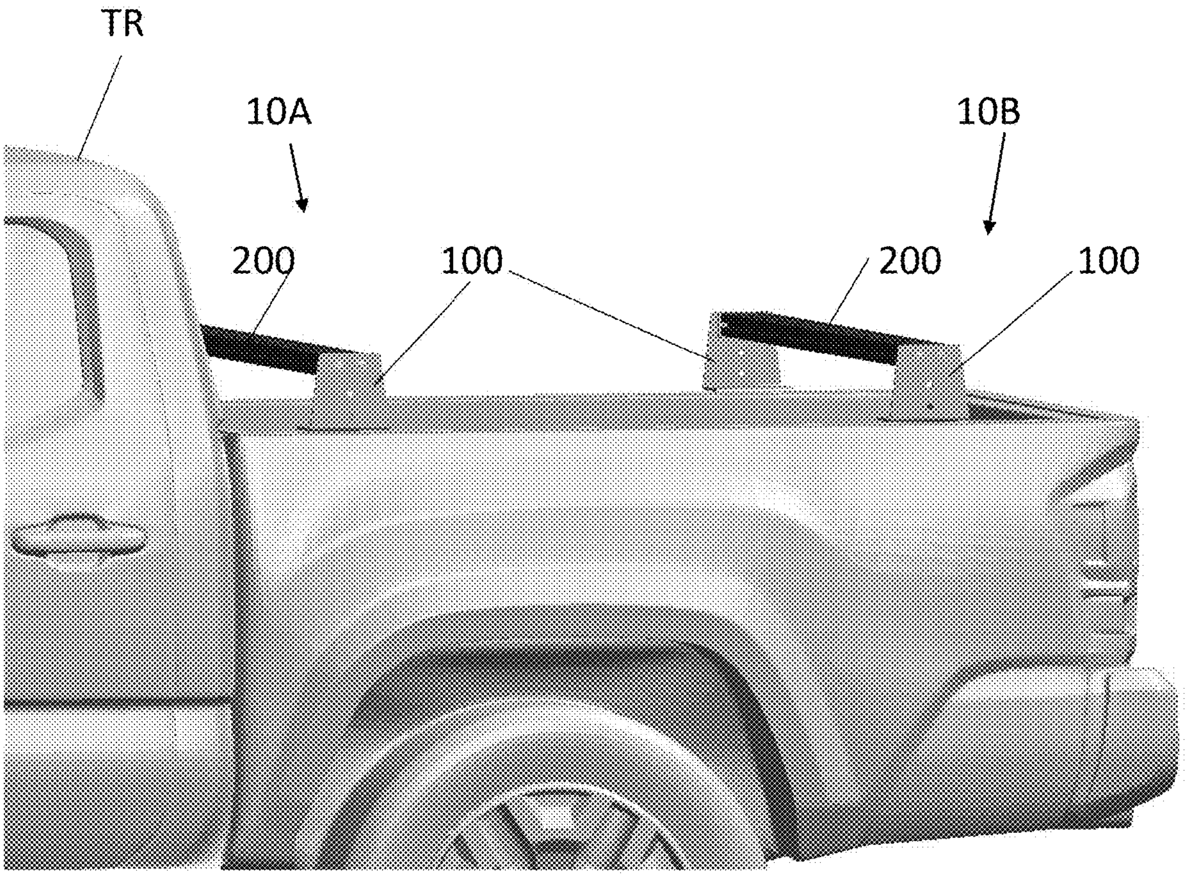
FIG. 2 is a side perspective view of the rack structure of a modular mounting system shown in FIG. 1 as mounted on a vehicle according to an illustrative implementation.
Figure 3:
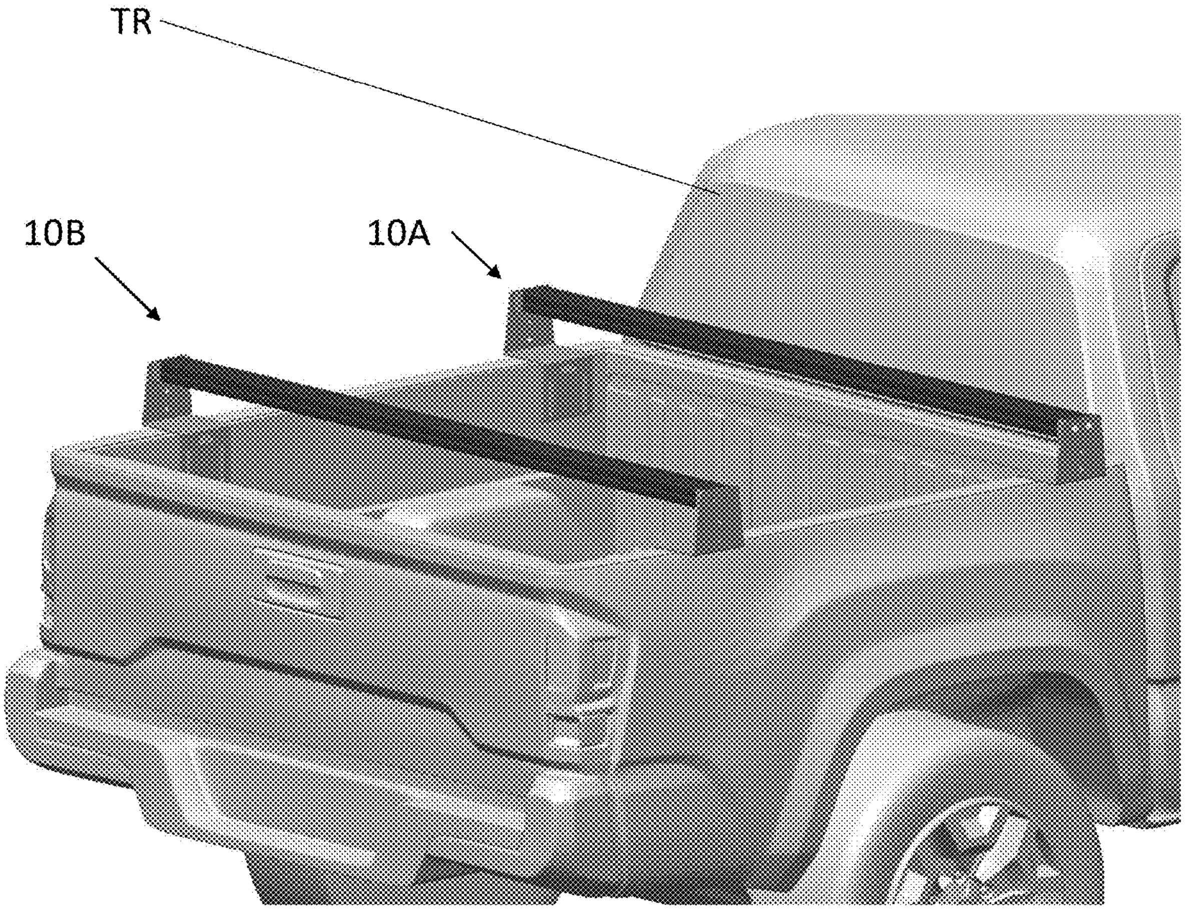
FIG. 3 is a rear perspective view of the rack structure of the modular mounting system shown in FIGS. 1-2.

As shown in the figures, the lower upright wall element 100D is preferably configured to be fixedly connected to a truck TR as shown in, e.g., FIGS. 2-3. For example, as shown in, e.g., FIGS. 2 and 3, in some embodiments, the support members 100 are fixedly connected to a peripheral wall of a truck bed, as shown, with the horizontal cross-element 100C resting upon an upper peripheral wall of the truck bed, and the lower upright wall element 100D extending downwardly along a side of the top end of the peripheral wall of the truck bed.

In some embodiments, the support members 100 are fixedly attached to the peripheral wall of the truck bed using one or more attachment members (e.g., bolts, screws, or the like), which can be bolted to the peripheral wall of the truck bed via one or more hole or opening in the lower upright wall element 100D. In some embodiments, a plurality of elongated openings 100D1 are formed via which such attachment members can be passed through for attachment to the peripheral wall of the truck bed. As shown in, e.g., FIG. 1, in some embodiments, one or more additional hole or opening 100D2 can be formed within the lower upright wall element 100D via which attachment members can be inserted for fixation to the peripheral wall of the truck bed.

Figure 4:
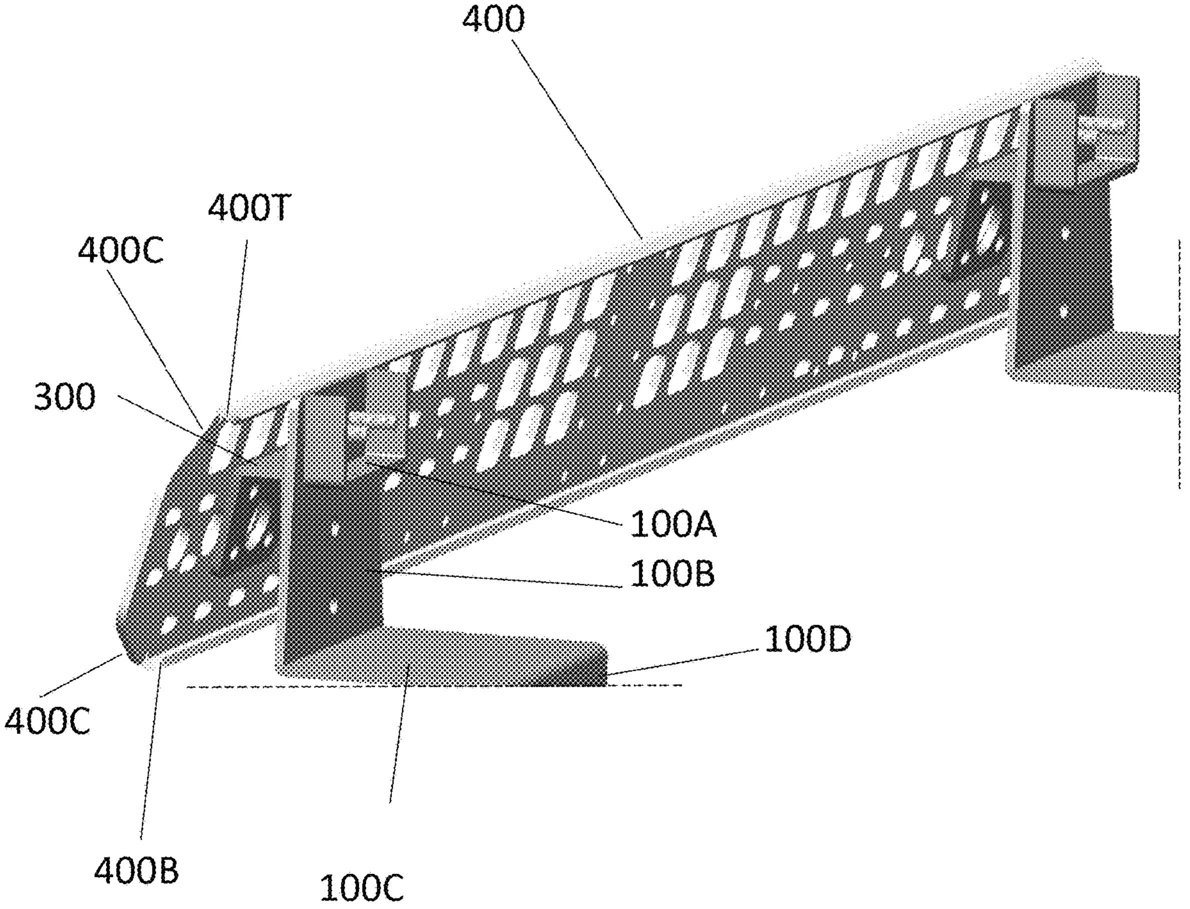
FIG. 4 is a side perspective view of the rack structure of the modular mounting system shown in FIG. 1, with mounting brackets and a side panel of the modular mounting system further attached.

As shown in FIG. 4, in some preferred embodiments, the support members 100 include cross-bar support braces 100A fixedly attached thereto. In the preferred embodiments, the cross-bar support braces 100A include a lower supporting surface upon which a cross-bar 200 can rest. In the preferred embodiments, the cross-bar support braces 100A also include at least one upwardly extending lateral support surface for fixing the location of the cross-bar 200 upon the brace 100A. In the illustrated embodiment, the support braces 100A include two upwardly extending lateral support surfaces, such that the support braces 100A form substantially U-shaped members having an open top end which can readily receive an end of a cross-bar 200.

Figure 17:
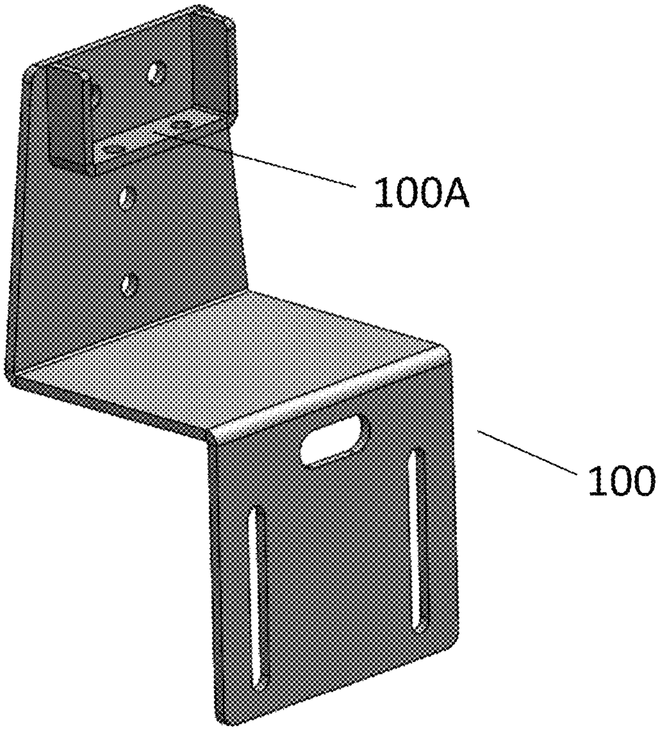
FIG. 17 is a perspective view of a support member according to some embodiments.

The cross-bar support braces 100A act as structural members of the modular system to both support the cross bar rail system and provide safety for critical points of failure. The dimensions of the cross-bar support braces 100A can be between about 0.5 inches and about 7 inches wide, and between about 0.5 inches and about 7 inches tall. The cross-bar support braces 100A may be made from steel, welded construction, aluminum, molded plastics or composites. FIG. 17 provides a detailed view of support member 100 and one embodiment of the cross-bar support brace 100A. The cross-bar support braces 100A can be a single shaped piece or it can be two or more separate pieces.

Figure 18:
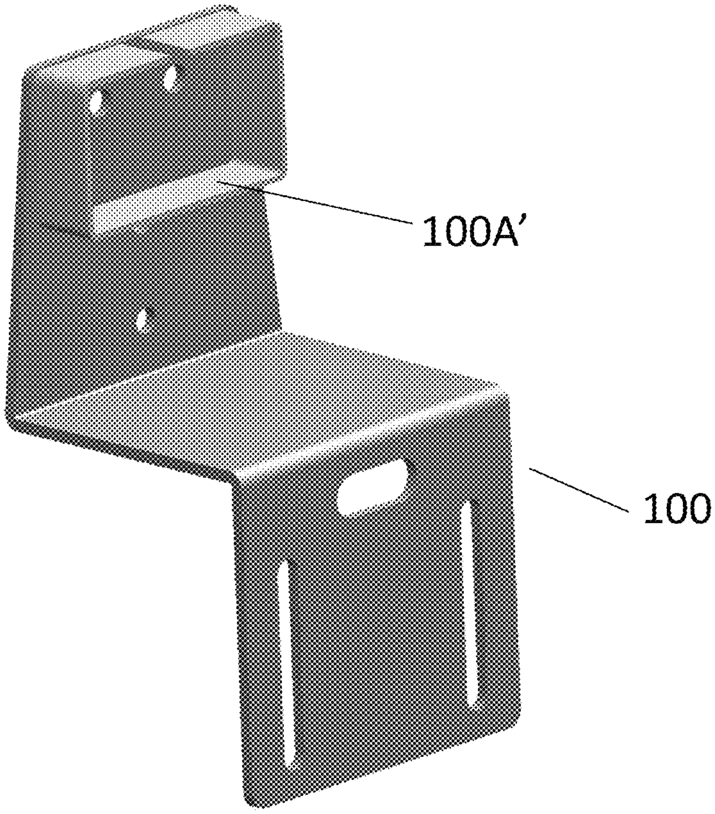
FIG. 18 is a perspective view of a support member according to some embodiments.

As described above, the cross-bar support braces have a lower supporting surface and at least one upwardly extending lateral support surface. The cross-bar support braces may also have three or more surfaces. FIG. 17 shows one embodiment in which cross-bar support brace 100A has three surfaces (a lower supporting surface and two upwardly extending lateral support surfaces). The cross-bar support brace can also have three or more surfaces, and the cross-bar support brace can have a top surface. FIG. 18 shows an embodiment in which cross-bar support brace 100A' has a lower supporting surface, two lateral surfaces and a top surface.

In some preferred embodiments, the cross bars 200 are extruded members. In some preferred embodiments, the cross-bars are made with extruded aluminum. In some embodiments, the cross-bars can be formed with a substantially rectangular or square cross-sectional configuration. In some embodiments, such as, e.g., shown, the cross-bars include ridges or channels extending along the lengths of one or more of the walls of the cross-bars. In the preferred embodiments, the ridges or channels are configured to facilitate mounting of accessories to the cross-bars. Moreover, the ridges or channels can also serve to increase strength of the cross-bars and resist breakage and/or bending.

In some preferred embodiments, plug members can be inserted into the ends of the cross-bars, which plug members can include threaded receiving holes for receiving the ends of bolts or screws SC (see, e.g., FIG. 9) that are passed through holes 100B2 (see, e.g., FIG. 1) of the upper upright wall element 100B. Accordingly, in some embodiments, the cross-bars 200 can be placed within the cross-bar braces 100A and bolts or screws SC can readily be screwed into the ends of the cross-bars (e.g., within plug members discussed above).

In some preferred embodiments, the support members 100 can be formed by bending an initially formed flat metal sheet or plate member to form two substantially upright wall elements that are horizontally offset from one another via a horizontal cross-element as described above. In some alternative embodiments, the support members 100 can be molded into this configuration without bending of an initially formed flat metal sheet or plate member.

In some preferred embodiments, the cross-bar support braces 100A of the support members 100 can be welded or otherwise connected to the upper upright wall element 100B. In some preferred embodiments, the support members 100 can be formed by molding (e.g., injection molding) in order to form a support member as shown in the figures.

In some preferred embodiments, as shown in, e.g., FIGS. 2-3, the lower upright wall element 100D extends flush along the upper periphery of the peripheral wall of the truck bed, such as to minimally intrude into the truck bed. Similarly, in some preferred embodiments, the horizontal cross-element 100C rests flush upon the upper peripheral wall of the truck bed, such as to minimally extend or protrude over the top end of the upper peripheral wall of the truck bed as shown in FIGS. 2-3. As a result, the support members 100 are advantageously configured to avoid interference with truck bed covers, tonneau covers, or other mechanisms that are placed or extended over the upper region of the truck bed.

In some preferred embodiments, as shown in, e.g., FIGS. 2-3, the width of the horizontal cross-elements 100C of the support members 100 are equal to or greater than the width of the top end of the peripheral wall of the truck bed. In that manner, the upper upright wall elements 100A preferably extend upwardly at locations laterally displaced to outer sides of the upper ends of the peripheral side walls of the truck bed. Among other things, this configuration provides a stream-lined, non-intrusive configuration that provides an open and unobstructed area above the entire truck bed. However, in some less preferred embodiments, horizontal cross-elements 100C could be provided that do not extend further laterally and that are less than the width of the top end of the peripheral wall of the truck bed.

In some illustrative embodiments, the width of the horizontal cross-elements 100C can be as shown in the figures, wherein in some embodiments, as discussed herein-above, the figures are to scale with sizes as described herein above. In some illustrative embodiments, the width of the horizontal cross-elements can be about 2" to 8", and, in some, more preferred embodiments, can be about 3" to 7", and, in some more preferred embodiments, can be about 4" to 6". In some preferred embodiments, the horizontal cross-elements extend outward from an edge of the top of the peripheral wall of the truck bed by at least ¼", and, in some, preferred embodiments, by at least ½", and, in some, preferred embodiments, by at least ¾", and, in some preferred embodiments, by at least 1", and, in some embodiments by at least 2". In some preferred embodiments, the horizontal cross-elements extend outward from an edge of the top of the peripheral wall of the truck bed by not more than about 3", or, in some embodiments, not more than 2", or in some embodiments, not more than 1".

In the preferred embodiments, the present invention can provide a very minimally intrusive and stream-lined and modular construction, which can advantageously provide novel and unique functional advantages without overly large and intrusive structures. Moreover, in the preferred embodiments, the present invention can provide a modular structure in which desired components or aspects of the modular construction can be readily employed and/or readily removed depending on needs and/or usage requirements. Moreover, in the preferred embodiments, the present invention provides a modular structure that is compact, such that, e.g., if any elements of the modular structure are removed, such elements can be readily stored within the vehicle or external to the vehicle without requiring substantial storage space and, thus, without overly impeding existing storage or capacity.

For example, in some embodiments, the modular system can be assembled as shown in FIGS. 2-3, such as to advantageously employ the useful cross-bars 200, and advantageous utility and advantages therefrom with a very compact and non-intrusive structure.

Additionally, in some embodiments, the modular system can further include lateral side panels 400 (see, e.g., FIG. 4) that can be readily attached to the upper upright wall elements 100B as shown. Towards that end, in some preferred embodiments, the upper upright wall element 100B includes a plurality of through-holes 100B1 (see, e.g., FIG.

1) that can be aligned to attach mounting brackets 300 (see, e.g., FIG. 100) by aligning through-holes 300C1 of the mounting brackets 300 with the through-holes 100B1, and passing through one or more a bolt(s), screw(s), rivet(s), clip(s) and/or other mechanical member(s) for fixedly connecting the elements together.

As shown in FIG. 10, in some preferred embodiments, the mounting brackets 300 are generally formed as an inverted V-shape, including an upright element 300C that includes the through-holes 300C1, which is placed flat alongside the upper upright wall elements 100B, a laterally extending element 300B, and a downwardly extending element 300A. In the preferred embodiments, the downwardly extending element 300A is configured to mount or support the side panel 400 (as shown). In the preferred embodiments, the downwardly extending element 300A includes through-holes to facilitate mounting the side panel 400. In some illustrative embodiments, the through holes can include a large central through hole 300A1 and/or a plurality of through holes 300A2. In some preferred embodiments, the side panel 400 can include similar through holes to facilitate alignment of the through holes of the side panel 400 and the downwardly extending element 300A of the mounting bracket 300. In some preferred embodiments, the side panels 400 can include a plurality of similarly configured through holes at both end regions of the side panel such as to enable attachment of the downwardly extending element of the mounting bracket 300 at a plurality of locations along the length of the side panel. In that manner, the modular system preferably conveniently enables the relative positions of the support members 100 to the side panels 400 to be modified or varied to accommodate different circumstances or environmental conditions.

Figure 5:
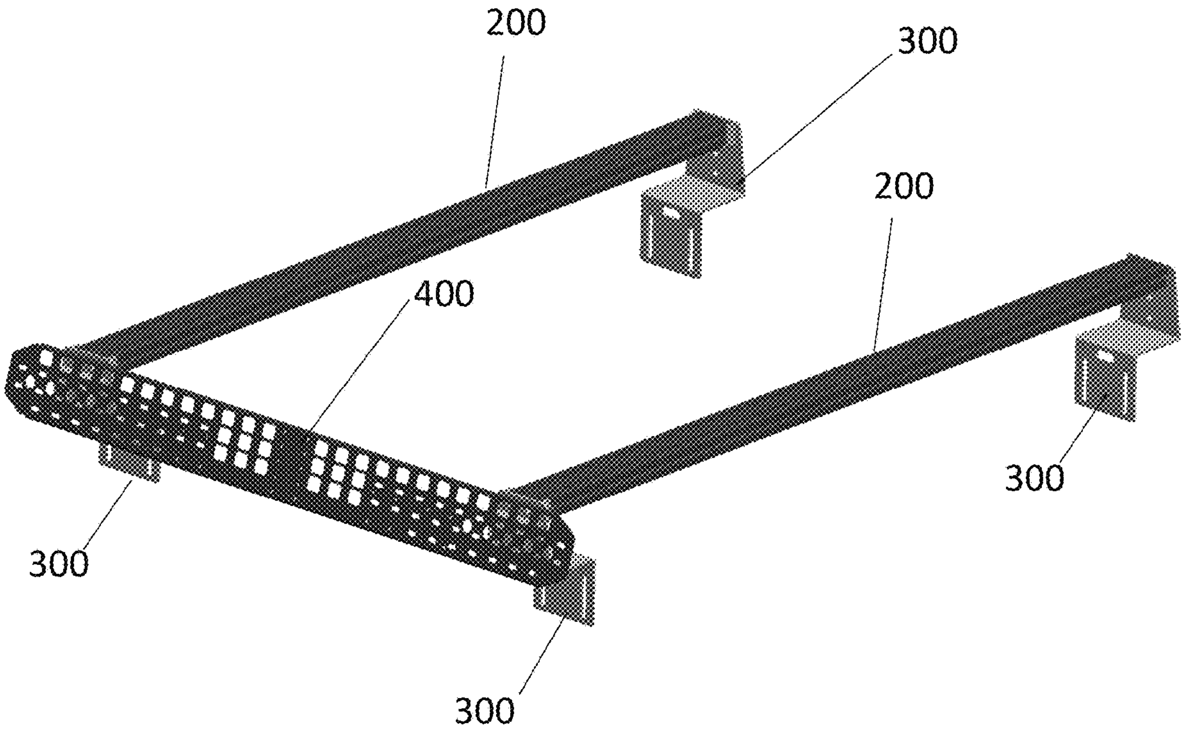
FIG. 5 is an upper perspective view of the components of the modular mounting system shown in FIG. 5 along with supporting cross-bar components of the modular mounting system.
Figure 6:
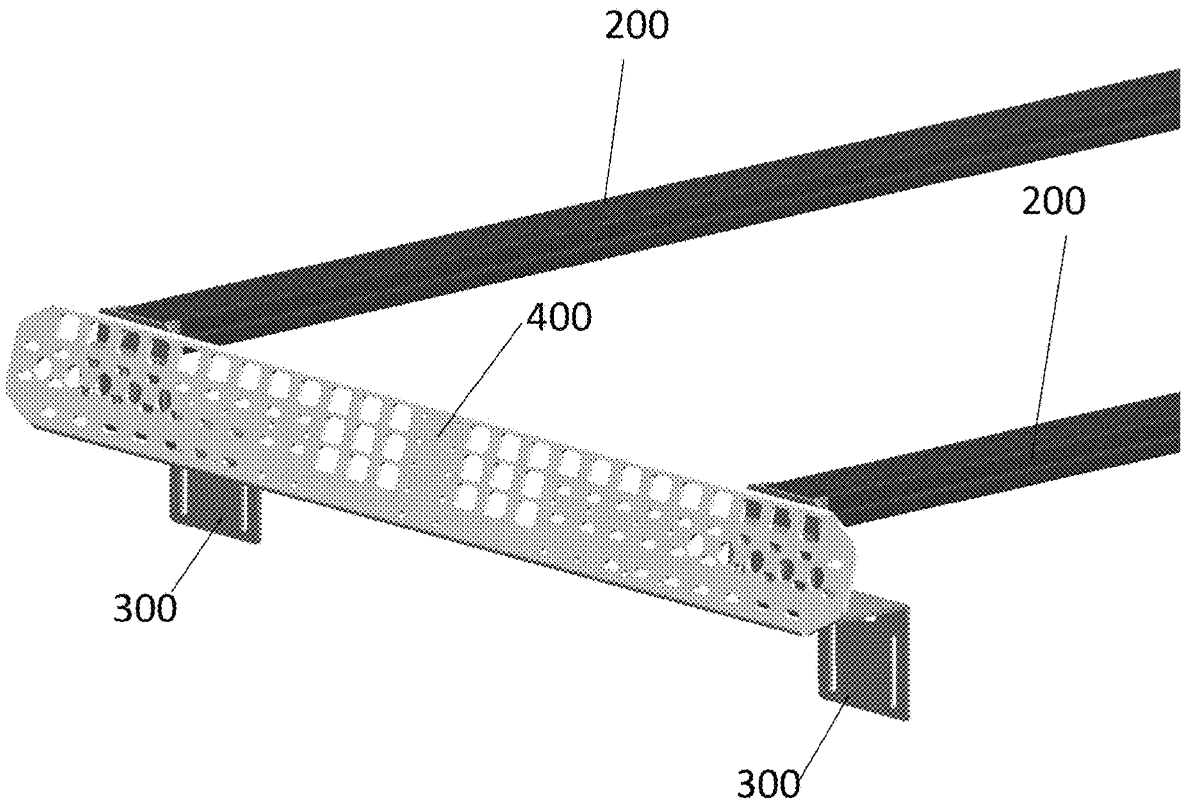
FIG. 6 is a close up of a side panel region of the modular mounting system shown in FIG. 5.
Figure 7:
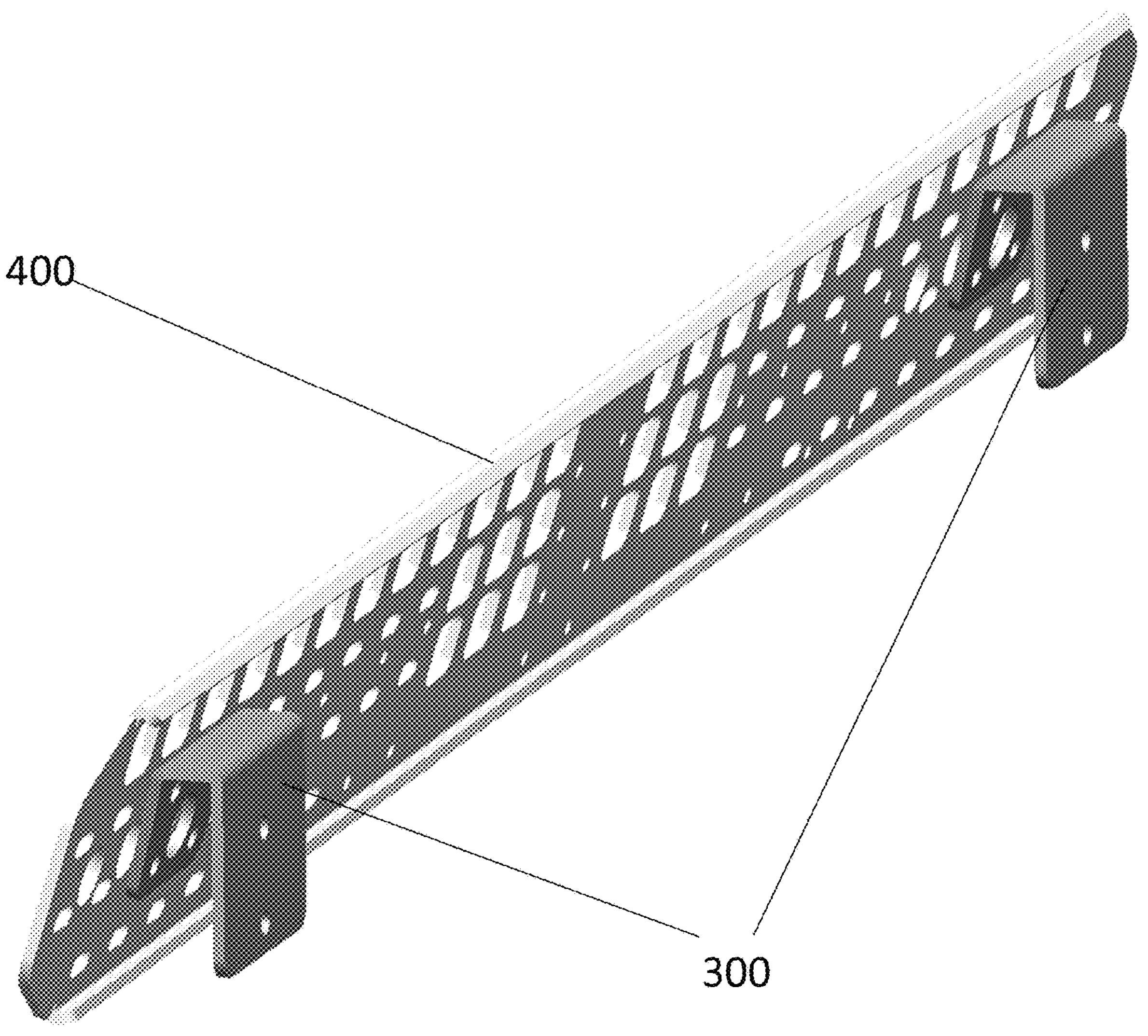
FIG. 7 is a perspective of the rear side of the side panel and mounting brackets shown in, e.g., FIG. 4.

In some preferred embodiments, the side panels 400 are formed from a metal sheet. In some preferred embodiments, the side panels include through-holes as described herein, which are configured to facilitate attachment of accessories and the like. Additionally, in the preferred embodiments, the side panels are also configured to create an interesting ornamental structure. Furthermore, in some embodiments, the side panels can be colored, painted or otherwise decorated. For example, with the modular structure, in some embodiments, a user could install different side panel members depending on circumstances. For example, side panel members could have different hole patterns or attachments. As another example, side panel members could have different coloring, logos, advertisements or the like. Accordingly, a user could readily alter functionality and/or ornamentation of the side panels by implementing different or new side panels in some embodiments. For example, FIG. 5 is an illustrative embodiment in which the outer surface of the side panel is colored "blue" as one illustrative embodiment.

In some preferred embodiments, the peripheral edges of the side panels 400 can include bent or curved flange portions, such as, e.g., a top flange portion 400T and/or a bottom flange portion 400B as shown in FIG. 4. Among other things, such flange portions can enhance strength and rigidity of the side panels, as well as the ornamental appearance of the side panel. Moreover, in some preferred embodiments, the forward and/or rearward ends of the side panels 400 can include angled or chamfered regions 400C. Among other things, such chamfered regions 400C can help reduce presentation of sharp corners, enhance aerodynamics, and enhance ornamental appearance of the side panels. In some alternative embodiments, different side panel structures can be provided, such as, e.g., side panels with smaller lengths, different hole patterns, different coloring, different logos, different advertising and/or other variations, which a user can implement depending on circumstances.

In some preferred embodiments, the side panels include an array of openings to facilitate mounting of accessories and the like. In some embodiments, the array of openings includes a variety of shapes and sizes of openings to facilitate mounting of a variety of accessories and the like, including, e.g., substantially rectangular openings (e.g., see 410A in FIG. 8), substantially circular openings (see, e.g., 410D and 410C in FIG. 8), and/or substantially horizontally elongated openings (see, e.g., 410B in FIG. 8).

In some illustrative embodiments, the cross-bars can include cross bars that include attachment mechanisms, such as, e.g., channels or ridges that are configured to facilitate mounting of accessories to the cross-bars. For example, in some preferred embodiments, the cross-bars include channels that are designed for mounting of accessories to the channels. In some embodiments, the cross-bars can include cross-bars similar to that of any of the elongated bars as set forth in the following patents and publications, the entire disclosures of which are incorporated herein by reference as though recited herein in full.

1. U.S. Pat. No. 5,429,438;
2. U.S. Pat. No. 9,115,741;
3. U.S. Pat. No. 6,481,177;
4. U.S. Patent Pub. No. 2013/0243524.

Figure 12A:
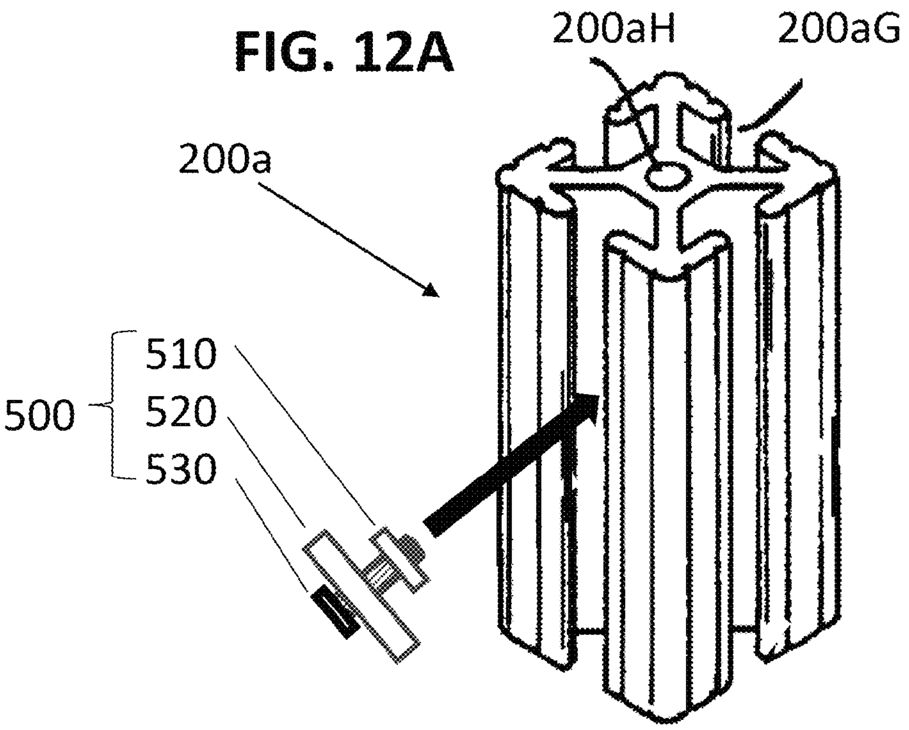
FIG. 12A is a perspective view of an illustrative type of cross-bar structure according to some illustrative embodiments.
Figure 12B:
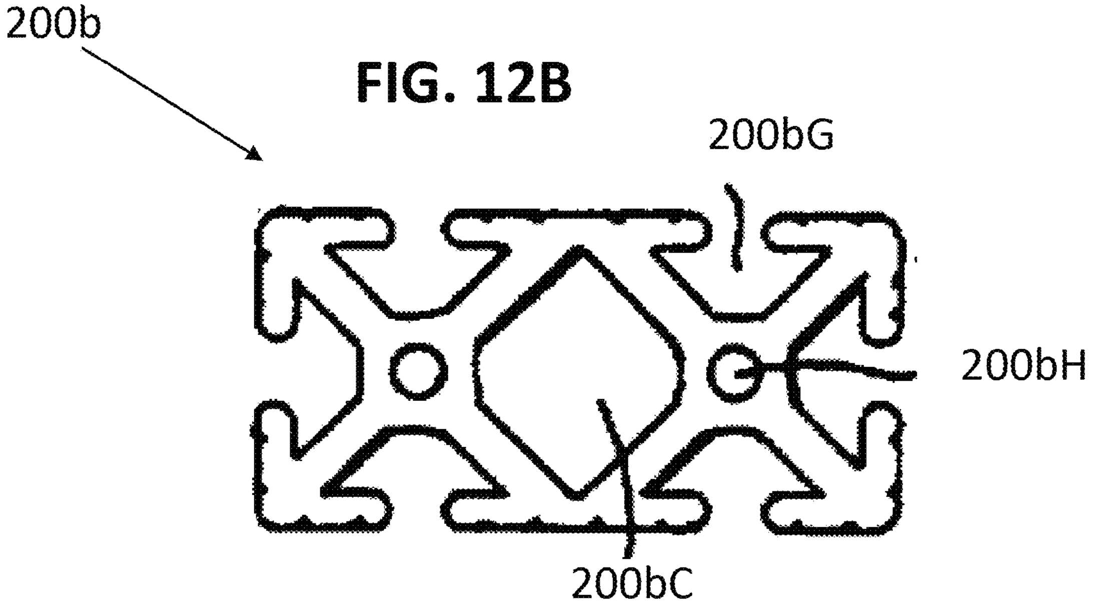
FIG. 12B is an end view of another illustrative type of cross-bar structure according to some other illustrative embodiments.

For reference, in some embodiments, a cross-bar can be configured similarly to that shown in FIG. 12A or 12B (i.e., which are similar to cross-bars shown in the above U.S. Pat. No. 5,429,438). For example, FIG. 12A shows a cross bar 200*a*, having four T-slot channels 200*a*G. As schematically shown in FIG. 12A, such T-slot channels can readily support a variety of accessories that can be mounted thereto by mounting hardware configured to be mounted to such T-slots. For example, FIG. 12A shows an illustrative mounting hardware 500, which includes a threaded nut member 510 configured to fit within the slot of the T-slot, a plate member 520 having a through-hole and configured to be placed alongside the cross-bar 200*a* adjacent the T-slot having the threaded nut member 510, and a bolt 530 configured to pass through the plate member 520 and be threadedly engaged with the threaded nut member 510. In some embodiments, the nut member 510 can be initially inserted into the T-slot via the axial open end shown at the top of FIG. 12A, while in some embodiments, the nut member 510 can be laterally slit through the narrower elongated slot at a position between the ends of the cross-bar and then turned to align with the bolt 530 for threading connection. Although FIG. 12A shows a plate member 520, in various embodiments, the member 520 can be configured in a variety of manners and/or can be attached to further elements to support a variety of items and/or accessories.

As also shown in FIG. 12A, in the preferred embodiments, the cross-bar 200*a* includes a central hole 200*a*H, via which a supporting bolt or the like can be threadingly connected in some preferred embodiments.

With reference to FIG. 12B, this figure shows another embodiment that is more analogous to the embodiment shown in FIGS. 1-11, which includes six T-slots 200*b*G around the periphery of the cross-bar 200*b*. In the embodiment shown in FIG. 12B, the central region 200*b*C is preferably open, and two central holes 200*b*H are included via which supporting bolts or the like can be threadingly connected in some preferred embodiments. The embodiment shown in FIG. 12B can be adapted to connect accessories similarly to that of the embodiment of FIG. 12A, as well as to that of the various patents and publications incorporated herein.

As discussed herein-above, in the preferred embodiments, the present invention provides a novel support structure and mechanism for mounting of accessories above a bed of a truck or other vehicle, which substantially does not interfere with normal operation and use of a tonneau cover or other cover that extends over the bed of the vehicle. For example, the preferred embodiments can advantageously work in conjunction with covers that are configured to be supported upon an upper end of a peripheral wall surrounding a vehicle bed similar to that shown in FIG. 13A. As another example, the preferred embodiments can also advantageously work in conjunction with covers that are configured to be supported within the periphery of the peripheral wall surrounding a vehicle bed (such as, e.g., upon supporting rails mounted within the peripheral wall of the vehicle bed) similar to that shown in FIG. 13B.

Figure 13A:
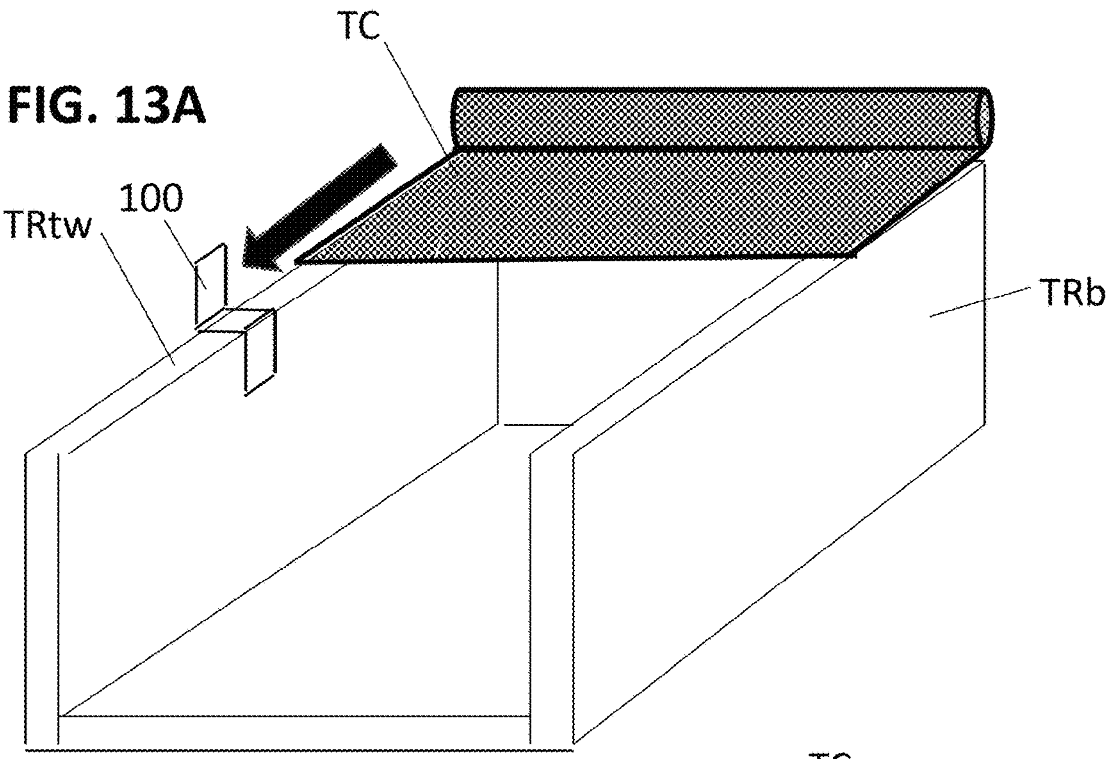
FIG. 13A is a schematic diagram showing a rear perspective view of a support member according to some embodiments advantageously accommodating a cover of a vehicle bed in some embodiments.

Additionally, the present invention can work in conjunction with covers or tonneau covers that are formed such as to be pulled from a roll and extended to cover the vehicle bed (such as, e.g., by pulling in the direction of the arrow shown in FIG. 13A) and also in conjunction with covers that folded over or otherwise placed upon the peripheral wall of the vehicle bed and/or upon rails that are mounted to the peripheral wall of the vehicle bed. As shown in FIG. 13A, a support member 100 is preferably configured to have a very thin profile in the front-back direction of the vehicle (e.g., as viewed in the direction of the black arrow shown in FIG. 13A), such as to avoid interference or obstruction with the tonneau cover TR, which is supported on or over the upper surface TRtw of the peripheral wall of the truck bed TRb during normal use of the tonneau cover.

Figure 13B:
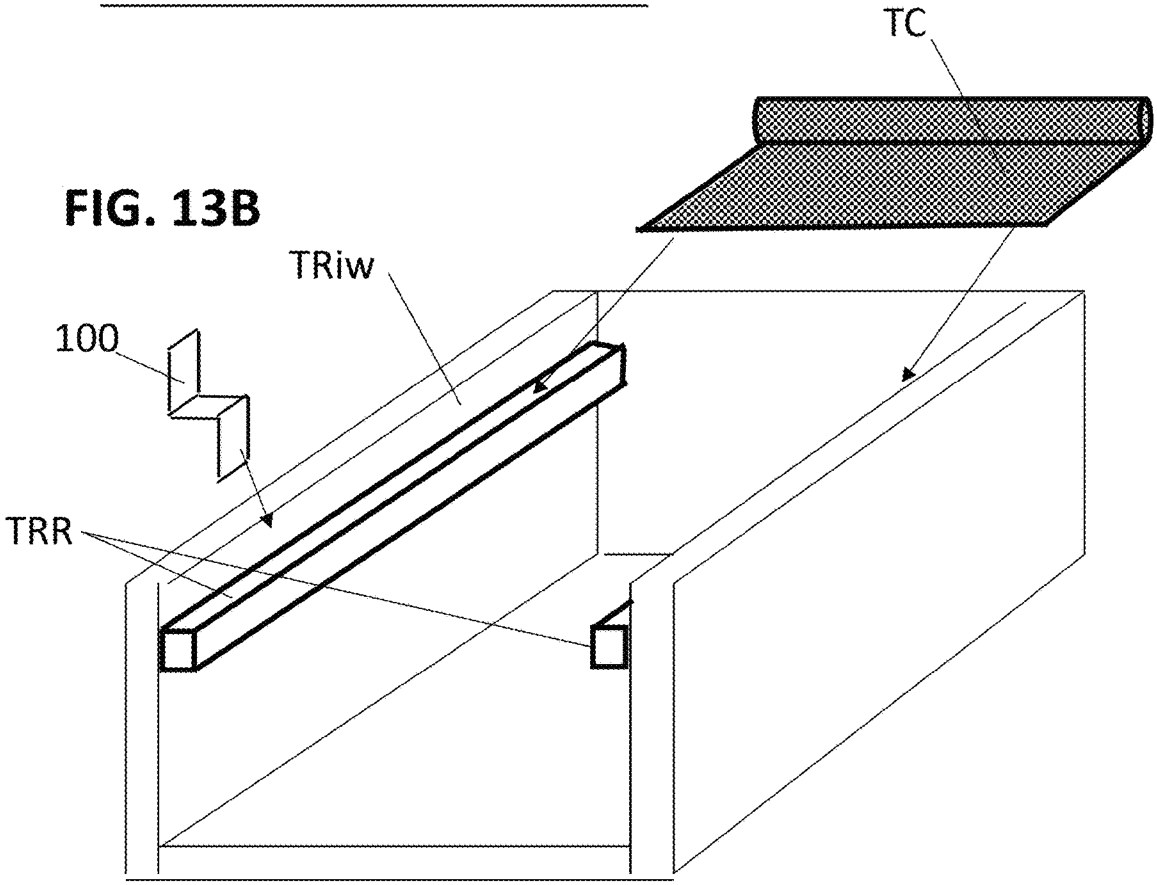
FIG. 13B is another schematic diagram showing a rear perspective view of a support member according to some embodiments advantageously accommodating a cover of a vehicle bed in some embodiments in which the cover is supported upon rails mounted within the vehicle.
Figure 14A:
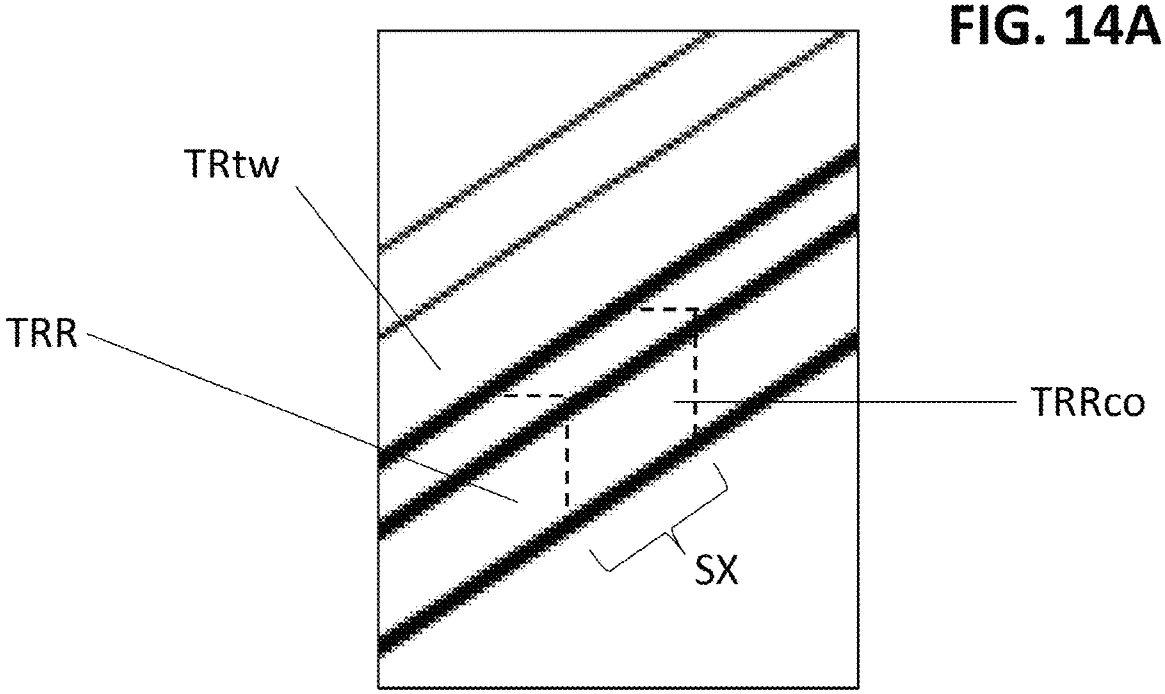
FIG. 14A is an enlarged explanatory view of a portion of FIG. 13B showing a region of a rail according to some illustrative embodiments.
Figure 14B:
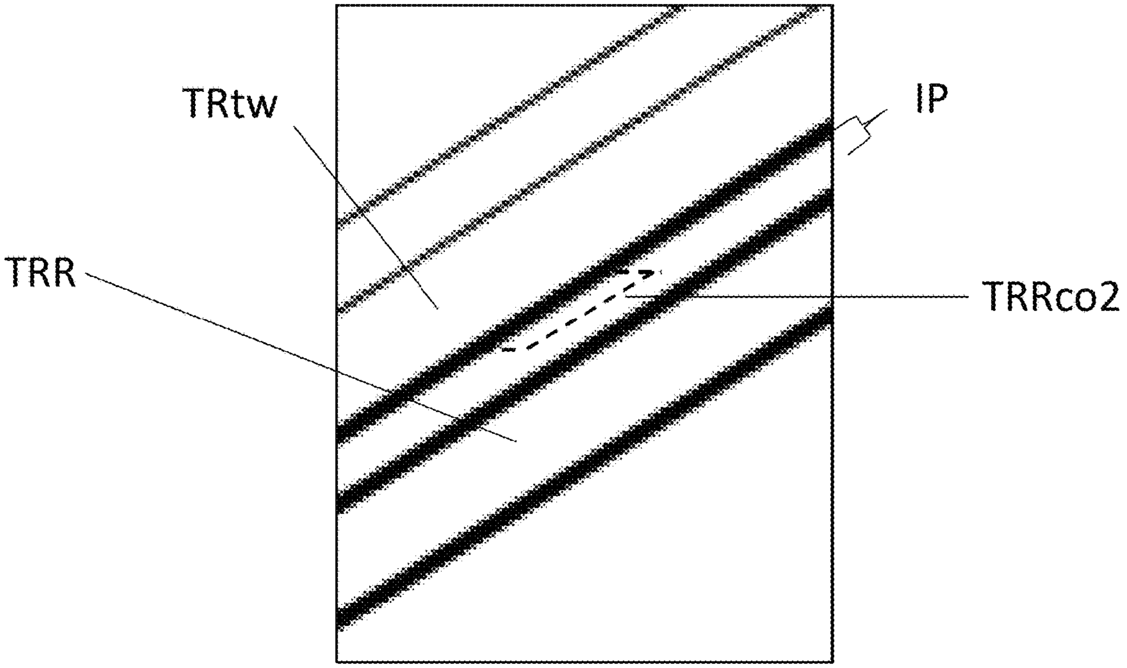
FIG. 14B is another enlarged explanatory view of a portion of FIG. 13B showing a region of a rail according to some other illustrative embodiments.

As discussed above, in the preferred embodiments, with reference to FIG. 13B, the support members 100 are also configured to advantageously work in conjunction with covers that are configured to be supported within the periphery of the peripheral wall surrounding a vehicle bed (such as, e.g., upon supporting rails mounted within the peripheral wall of the vehicle bed) similar to that shown in FIG. 13B. By way of example, in some embodiments, the support member 100 can be mounted in a similar position on or over the upper surface TRtw of the peripheral wall of the truck bed TRb to that shown in FIG. 13A. In some preferred embodiments, the configuration of the support members 100 is sufficiently thin and non-intrusive that the lower section 100D of the support member can be mounted in between the support rail TRR and the inner peripheral wall TRiw of the truck bed. In some embodiments, rather than simply placing the lower section 100D between the rail TRR and the wall TRiw, the rail TRR can be adapted or modified to accommodate the lower section 100D. For example, FIGS. 14A and 14B show an enlarged portion of an upper region of the left side wall shown in FIG. 13B. As shown in the example of FIG. 14A, in some embodiments, to accommodate the lower section 100D of the support member 100, a region TRRco of the rail TRR can be removed from the rail. In this embodiment, the distance SX of this region is preferably the same or slightly larger than the corresponding width of the support member 100 to receive the support member while maintaining more of the rail TRR. On the other hand, as shown in the example of FIG. 14B, in some embodiments, to accommodate the lower section 100D of the support member 100, a region TRRco2 is cut out from a portion of the rail TRR to accommodate the thickness of the lower section 100D of the support member 100. As shown in FIG. 14B, in this example, the cutout does not extend entirely across the rail TRR, but merely extends inwardly a distance IP that is sufficient to accommodate the thickness of the lower section 100D. Moreover, as with the embodiment shown in FIG. 14A, this cutout section TRRco2 should also extend a similar distance in the rear to front direction SX as shown in FIG. 14A.

In the preferred embodiments, the present invention can, thus, enable an existing tonneau cover or the like to be maintained on the vehicle bed in a normal fashion without interfering with the use of the cargo area of the vehicle bed. Moreover, the preferred embodiments of the present invention are adaptable to a variety of circumstances and a variety of types of tonneau covers and the like.

Moreover, the preferred embodiments provide a very light-weight and non-intrusive structure that can be easily installed on a vehicle and that can remain on the vehicle without interfering or obstructing normal use of the vehicle. Moreover, the modular structure of the present invention greatly facilitates switching between various modes of operation very easily and conveniently. For example, in some embodiments, the support members 100 can be installed on the vehicle, and the cross-bars 200 and/or side panels 400 in a stored position (e.g., within the vehicle bed, such as on the floor of the vehicle bed) or at another location; notably, in such a state, the support members 100 are completely non-intrusive and the cross-bars 200 and side panels 400 are simple configurations (e.g., flat members) that do not take up much storage room.

Furthermore, although the preferred embodiments are light-weight and non-intrusive, the preferred embodiments are also structurally strong and can accommodate very substantial loads and can be used to mount and support a wide variety of accessories on a vehicle.

Figure 14C:
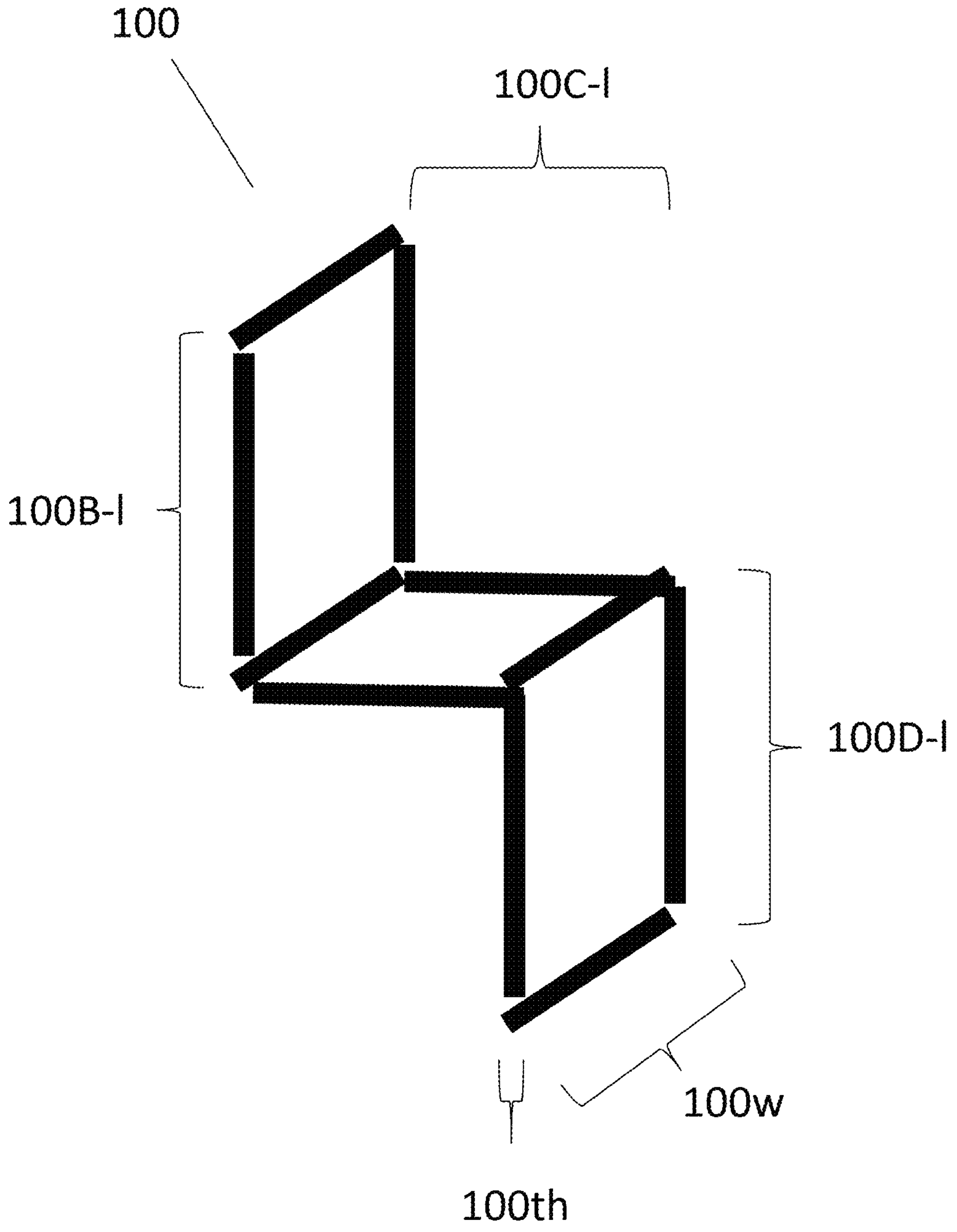
FIG. 14C is a schematic diagram of a support member according to some illustrative embodiments for depicting some exemplary dimensions according to some illustrative embodiments.

According to some illustrative and non-limiting embodiments, with reference to FIG. 14C, the support members 200 can be sized and dimensioned as follows:

a) In some embodiments, the thickness 100*th* of the support member 200 as viewed in the rear to front direction can be between about 1/16 inch to 8/16 inch, or, in some more preferred embodiments, between about 1.5/16 inch to 6/16, or, in some more preferred embodiments, between about 2/16 inch to 4/16 inch, or, in some illustrative embodiments, approximate 3/16 inch. In some preferred embodiments, the support member 200 is a metal member that further includes a protective coating. In some embodiments, the above dimensions are the thickness prior to the addition of such protective coating. In the preferred embodiments, the thickness 100th is sufficiently small such as to avoid interference with a tonneau cover or the like. Accordingly, in preferred embodiments, the total thickness of the support member 200 (including any coating) is less than about 6/16 inches, and, more preferably, less than about 5/16 inches, and, more preferably, less than about 4/16 inches.

b) In some embodiments, the width 100*w* is preferably slightly wider than the width of the cross bars 200, and, in some embodiments, the width 100*w* is between about 2 inches to 9 inches, and, more preferably, between about 3 inches to 8 inches, and, more preferably, between about 4 inches to 7 inches, and, more preferably, between about 4.5 to 6.5 inches. Although some embodiments can include upper sections 100B, cross sections 100C, and lower sections 100D all with substantially the same width, in some embodiments, the widths can vary between such sections. In some preferred embodiments, as shown in the embodiment of FIGS. 1-11, the lower section and the cross section are substantially the same width, and the upper section has substantially the same with as the lower and cross sections proximate a lower end, and narrows in width slightly (as shown) towards and upper end of the upper section.

c) In some embodiments, the height 100B-I is between about 2 inches to 9 inches, and, more preferably, between about 3 inches to 8 inches, and, more preferably, between about 4 inches to 7 inches, and, more preferably, between about 4.5 to 6.5 inches.

d) In some embodiments, the length 100C-I is between about 2 inches to 9 inches, and, more preferably, between about 3 inches to 8 inches, and, more preferably, between about 4 inches to 7 inches, and, more preferably, between about 4.5 to 6.5 inches.

e) In some embodiments, the length 100D-I is between about 2 inches to 9 inches, and, more preferably, between about 3 inches to 8 inches, and, more preferably, between about 4 inches to 7 inches, and, more preferably, between about 4.5 to 6.5 inches.

According to some embodiments of the invention, the support members 100 are made from a sheet metal that is bent to form the configuration as shown. In some preferred embodiments, the support members are made with metal. In some alternative embodiments, the support members can be made with other materials, such as, e.g., plastics, fiberglass, fiber-reinforced plastics, urethane, rubber, ceramics, composite materials and/or other materials. Additionally, in some preferred embodiments, the support members 100 can be formed by molding or casting, such as, e.g., by injection molding, blow molding, die casting and/or other molding or casting methods. In other embodiments, other methods of manufacture can be employed, such as, e.g., 3D printing and/or other techniques.

According to some embodiments, the cross-bars 200 are made with an extruded material, such as, e.g., an extruded metal, and, in some preferred embodiments made with an extruded aluminum. However, in other embodiments, the cross-bars can be made with other materials, such as, e.g., any of the above-noted materials that can be employed for making other illustrative embodiments of the support members 100 (e.g., plastics, fiberglass, fiber-reinforced plastics, urethane, rubber, ceramics, composite materials and/or other materials). Moreover, although some preferred cross-bars are formed by extrusion, other embodiments can employ other methods of fabrication, such as, e.g., any of the methods of fabrication described herein in relation to the fabrication of the support members 100.

According to some embodiments, the side panels or molle panels 400 are made with a sheet metal material. However, in other embodiments, the side panels 400 can be made with other materials, such as, e.g., any of the above-noted materials that can be employed for making other illustrative embodiments of the support members 100 (e.g., plastics, fiberglass, fiber-reinforced plastics, urethane, rubber, ceramics, composite materials and/or other materials). Moreover, in various embodiments, the side panels can be formed employing any of the same methods of fabrication described herein for the fabrication of the support members 100.

Illustrative Usage and Functionality in Preferred Embodiments

In the preferred embodiments, a modular system is provided that can advantageously achieve a variety of usages and functionalities in various embodiments of the invention.

a. Cross-Bar Usage and Functionality

In the preferred embodiments, the modular system can readily mount and support cross-bars 200 in a manner to achieve a wide range of functionality and usage. In some embodiments, two cross-bars 200 can be mounted to a vehicle. However, it should be appreciated, that in some embodiments, a single cross-bar 200 can be mounted in a manner to provide substantial benefits and usage. Similarly, in some embodiments, 3 or 4 or more cross-bars 200 can be readily mounted in an easy and non-intrusive manner with embodiments of the present invention.

By way of example, cross-bars 200 (e.g., two cross bars in some preferred embodiments) can be employed to mount one or more of:

1) Bicycles and bicycle racks;
2) Motorcycles and motorcycle racks;
3) Lawn equipment or lawn mowers;
4) Construction equipment;
5) Tents, Pop-up enclosures, Roof-top tents, and other enclosures for human inhabitation and/or usage;
6) Snowboard mounts;
7) Kayak mounts;
8) Fishing equipment mounts (fishing rod holders, etc.);
9) Container mounts (such as, e.g., for mounting cargo containers, storage containers, fluid containers, gasoline or other vehicle operation fluid containers, etc.);
10) Brackets or Other Mounts (such as, e.g., for mounting various items);
11) Tie Down Points (such as, e.g., brackets or mounts having pass-through holes or the like for tying down items with, e.g., ropes, bungee chords, hooks (e.g., hooks of bungee chords) or the like).

Some illustrative accessories or the like that can be supported or mounted on the cross-bars 200, include the following, which are incorporated herein by reference in their entireties:

1) Roam Adventure Co., rooftop tents, rooftop awnings, rugged containers, etc. (https://www.roamadventureco-.com/?gclid=Cj0KCQiAyoeCBhCTARIsAOfpKxg Knlp9bpQz2MKVqWoLV_dzsKk1H6IghtVQM4gHJy2y2p5jV3cD81cnEaArX
2) Freespirit Recreation, rooftop tents rooftop awnings, etc. (https://gofsr.com/?gclid=Cj0KCQiAyoeCBhCTARIsAOfpKxigArbCT6DukyEl1mPUBF2AGnL MrGBArQKqxdt6hhPI2G7JKn2YaAh8REALw_wcB)

Although in some preferred embodiments, one or more cross bar(s) 200 can be implemented along with one or more side panel(s) 400, in some embodiments, the modular system can be used to implement one or more cross bar even without any side panels. Notably, the structure of the present modular system provides a very compact and efficient structure that readily can implement one or more of said side panel(s) and cross bar(s) with compact and efficient structure.

b. Side Panel Usage and Functionality

In the preferred embodiments, the modular system can readily mount and support side panel(s) 400 in a manner to achieve a wide range of functionality and usage. Although in some preferred embodiments, one or more side panel(s) 400 can be implemented along with one or more cross-bar(s) 200 (and, in some preferred embodiments, two side panels are employed along with two cross bars), in some embodiments, the modular system can be used to implement one or more side panel even without any cross-bars.

In some illustrative embodiments, side panels 400 can be employed to support or mount one or more of the following accessories or more of:

1) Hand tools (such as, e.g., axes, shovels, and/or other elongated hand tools);
2) Firearms (e.g., rifles, etc., for hunting, police and/or military usage);
3) Boards (e.g., recovery boards for vehicles);
4) Equipment (e.g., vehicle support jacks, such as, e.g., Hi-Lift™ jacks, etc.);
5) Containers (e.g., fluid containers, gasoline containers, and the like, such as, e.g., ROTOPAX™ containers, etc.).
6) Brackets or Other Mounts (such as, e.g., for mounting various items);
7) Tie Down Points (such as, e.g., brackets or mounts having pass-through holes or the like for tying down items with, e.g., ropes, bungee chords, hooks [e.g., hooks of bungee chords] or the like)(notably, while the side panels preferable include pass-through holes [e.g., examples 410A-410D] that can operate as tie down points, in some embodiments separate tie down points, such as, e.g., brackets or mounts having pass-through holes or the like can be attached to the side panels).

Some illustrative accessories or the like that can be supported or mounted on the side panels 400, include the following, which are incorporated herein by reference in their entireties:
1) Quickfist™ Products (https://store.quickfist.com/)
2) MaxTrax™ Products (https://www.maxtrax.com.au/maxtrax-xtreme-pair-black
3) Hi-Lift™ Products https://hi-lift.com/hi-lift-jacks/4)
4) ROTOPAX™ M Products (https://rotopax.com/)

For reference, FIGS. 15A to 15G show a variety of applications of embodiments of the present invention on a variety of vehicles for supporting a variety of accessories and the like.

Figure 15A:
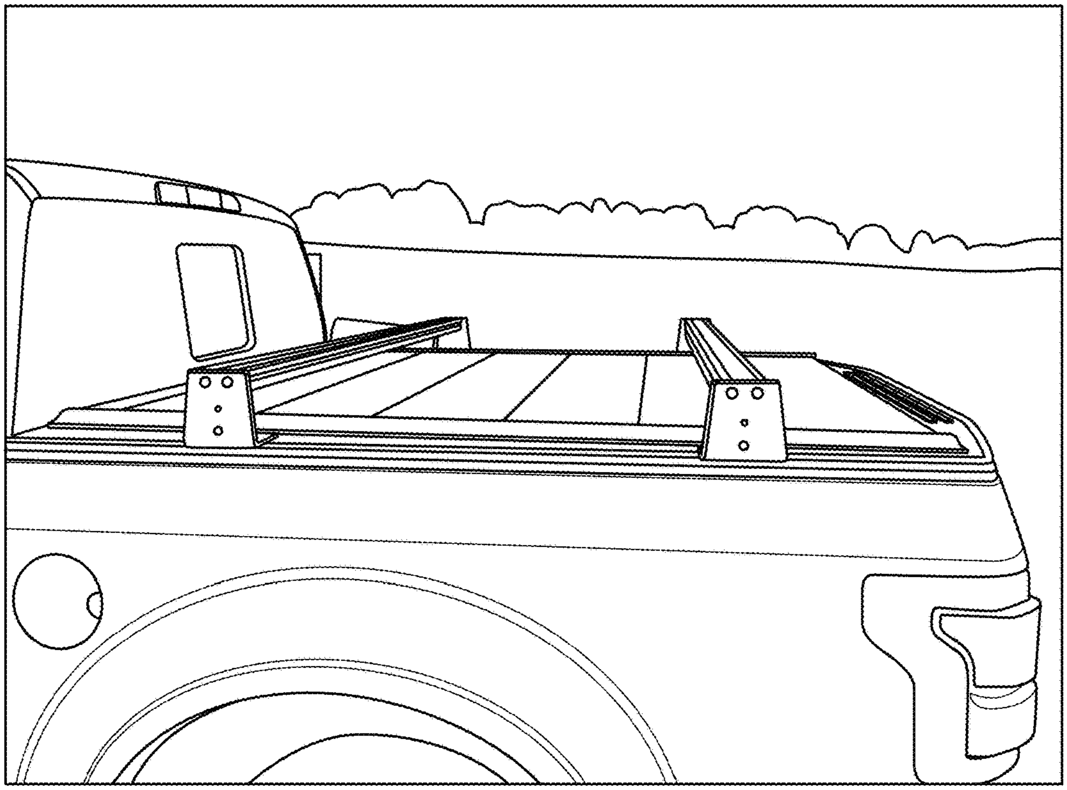
FIGS. 15A-15J are illustrative pictures of exemplary embodiments of the present invention demonstrating a variety of usage scenarios according to some illustrative examples.

With reference to FIG. 15A, this figure shows an illustrative side perspective view of an embodiment of the present invention employed on the back of a truck. As shown in this illustrative example, the present invention unintrusively enables a cover, such as, e.g., a tonneau cover to be used without any undue interference of the use.

Figure 15B:
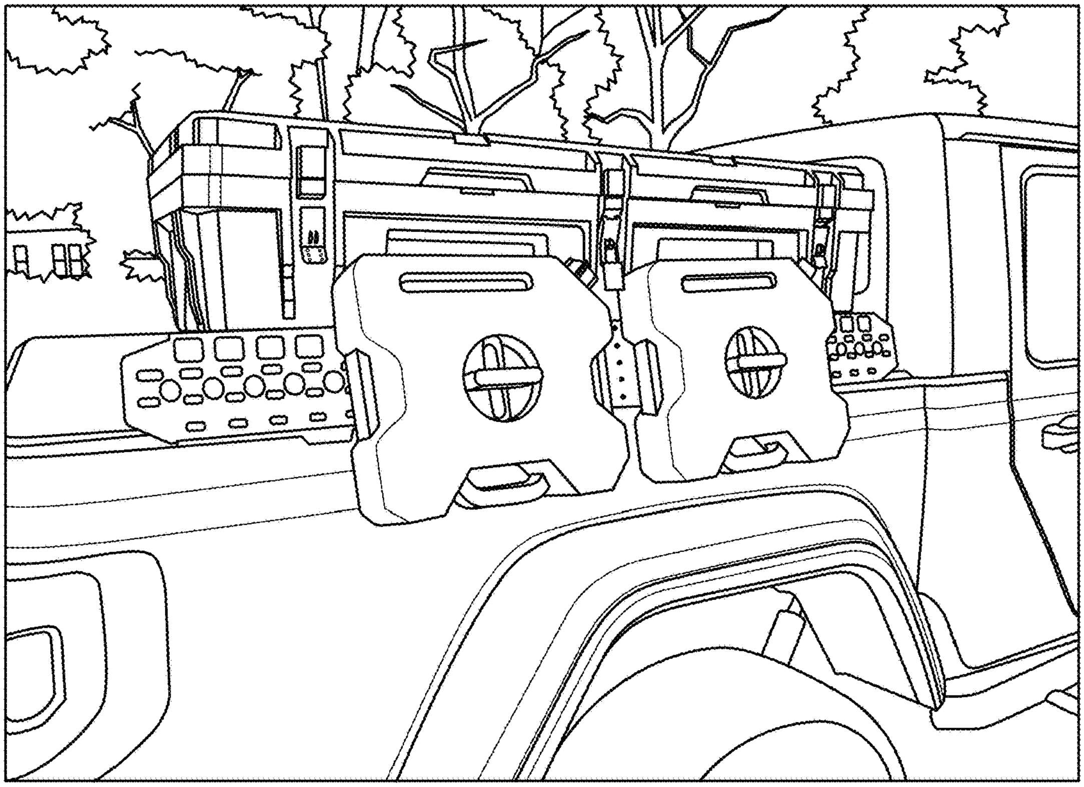

With reference to FIG. 15B, this figure shows an illustrative side perspective view of an embodiment in which containers are support upon the cross-bars and fluid containers are supported upon the side panels. As illustrated in this example, the containers on the cross-bars are conveniently maintained in this example at a height below the height of the roof of the vehicle (e.g., leading to benefits related to, e.g., air flow, and protection of items or accessories).

Figure 15C:
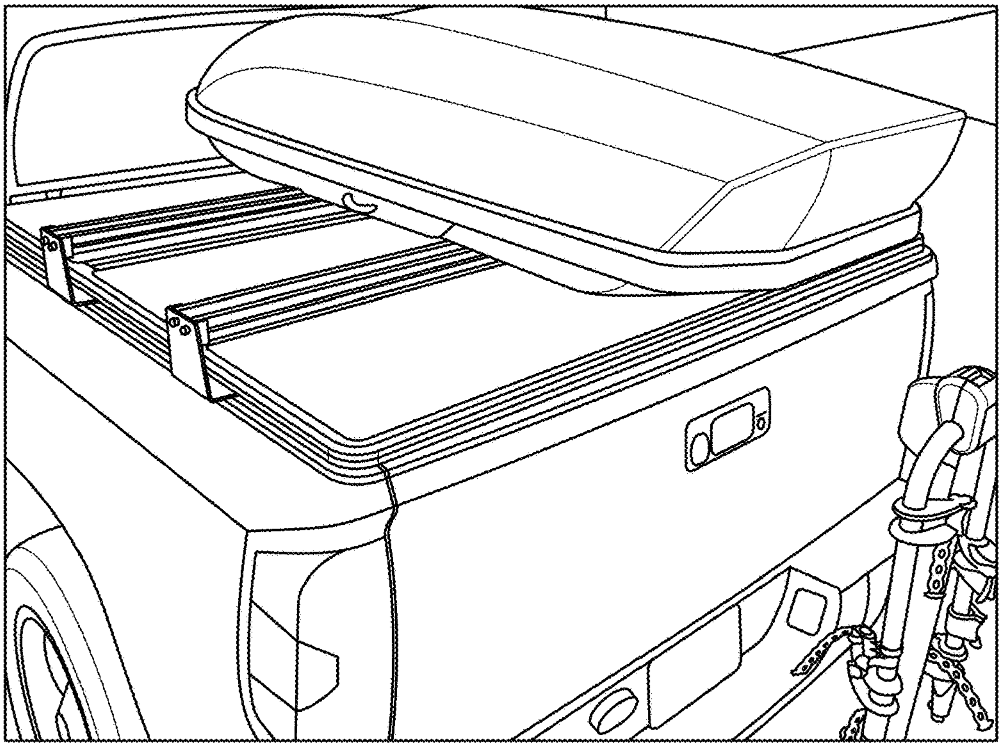

With reference to FIG. 15C, this figure also shows an illustrative container structure mounted to the cross bars, along with the concurrent use of an underlying cover or tonneau cover. As also illustrated in this example, the container is also conveniently maintained in this example at a height below the height of the roof of the vehicle.

Figure 15D:
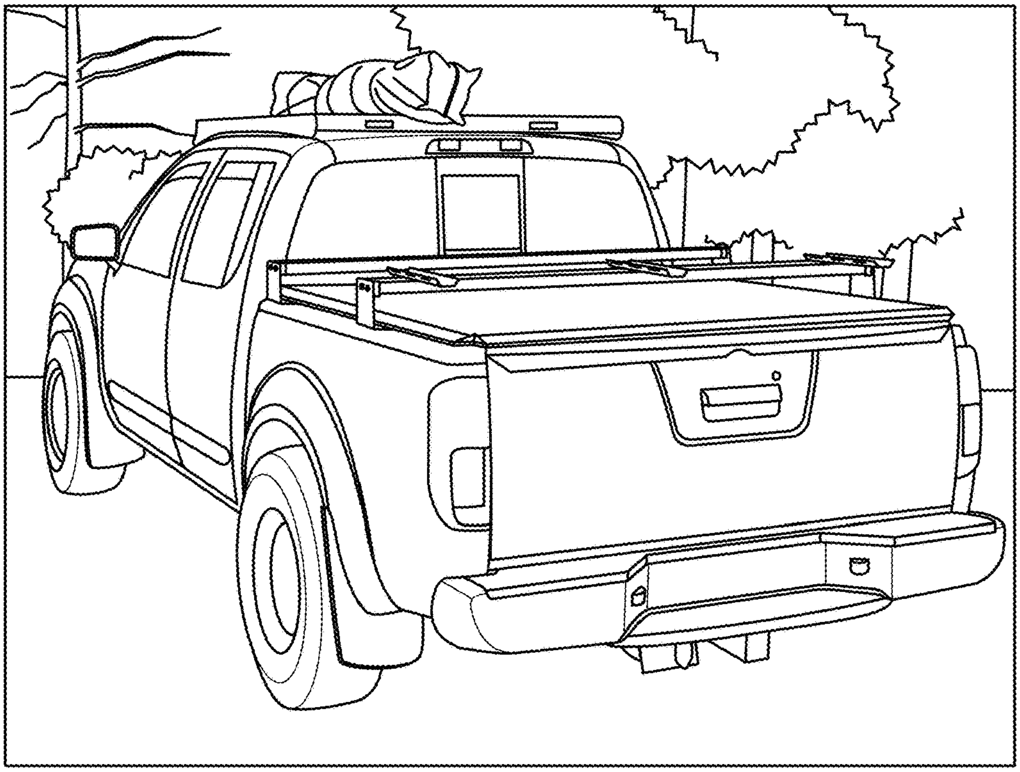

With reference to FIG. 15D, this figure shows an illustrative example of the system mounted on the rear of a vehicle. As also illustrated in this exemplary embodiment, although some preferred embodiments are configured such that the upper section 100B is located laterally outside of the vehicle bed, in some preferred embodiments, the upper section 100B is outside of the vehicle bed, but not further laterally extended than the widest part of the vehicle. For example, as shown, the rear fenders in this example extend further laterally outward than the upper section 100B. Among other things, this can help avoid having the upper section impinge upon an external structure during operation.

Figure 15E:
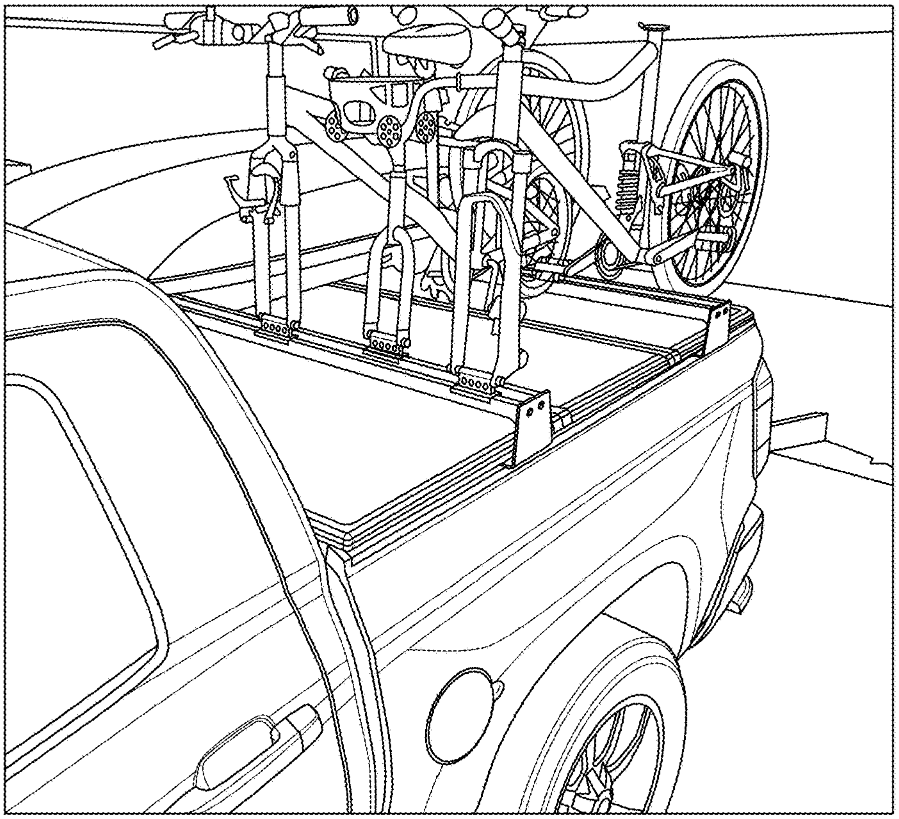

With reference to FIG. 15E, this figure shows an illustrative example of the system with bicycles mounted as illustrative mounted accessories.

Figure 15F:
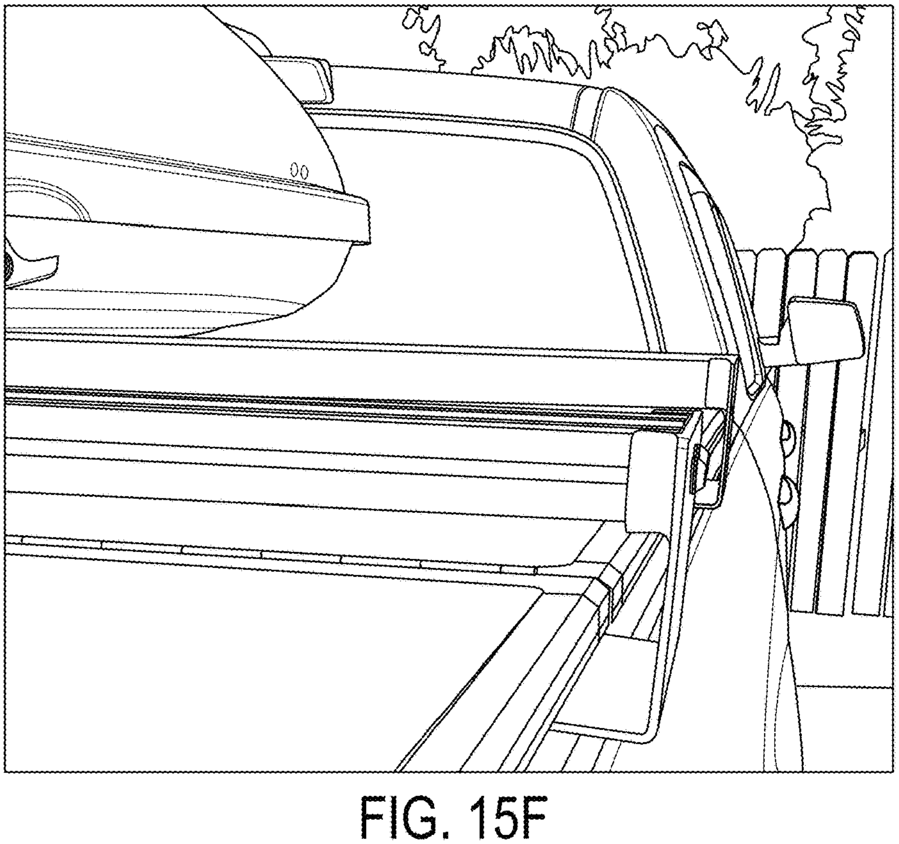

With reference to FIG. 15F, this figure also shows an illustrative example of the system according to some embodiments, demonstrating the unobtrusive nature of the system along, maintaining unobstructed clearance for normal use and operation of a cover and the like.

Figure 15G:
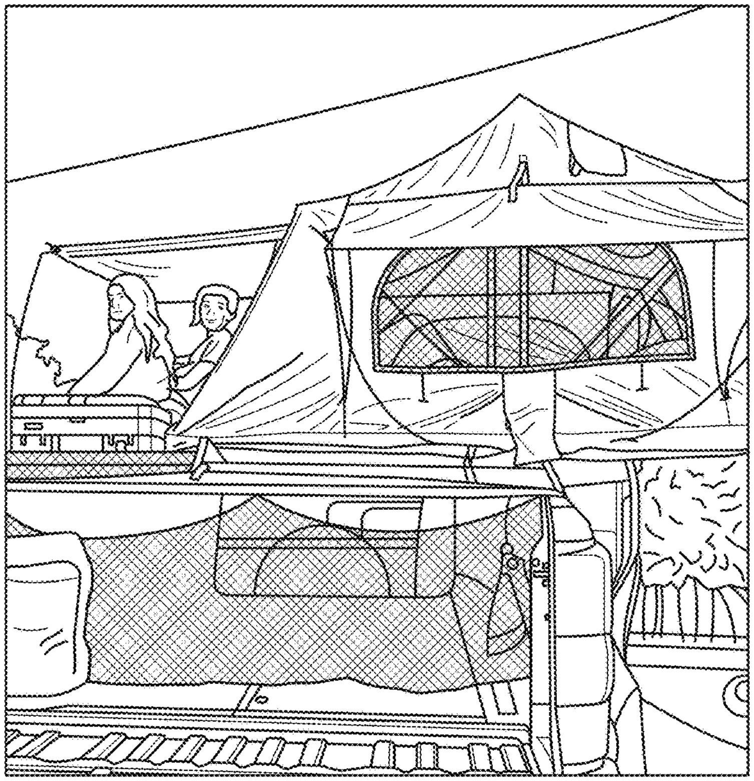
Figure 15H:
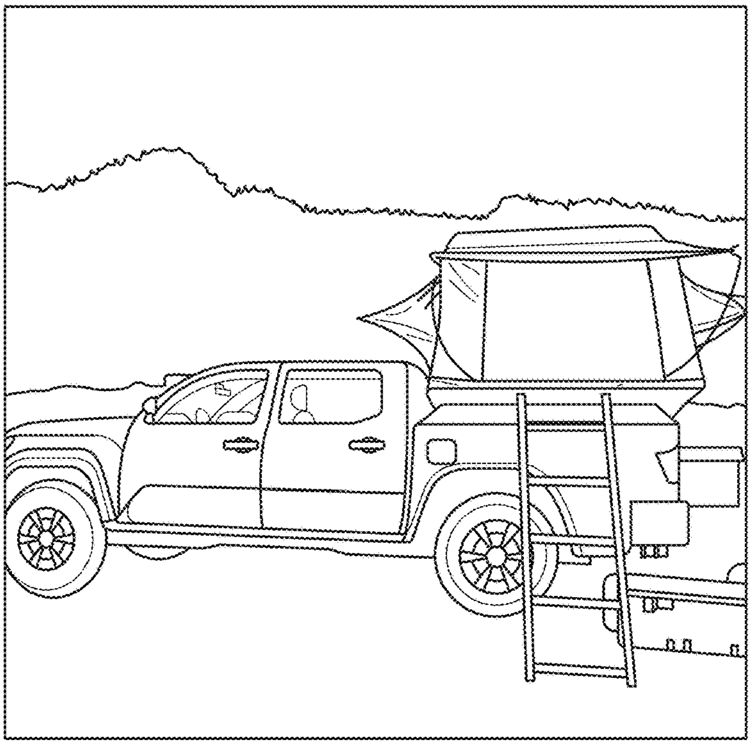

With reference to FIGS. 15G and 15H, FIG. 15G is a rear view of an illustrative vehicle employing an embodiment of the present invention such as to mount a tent, and FIG. 15H is a side view of a vehicle employing an embodiment of the present invention such as to mount a similar tent.

Figure 15I:
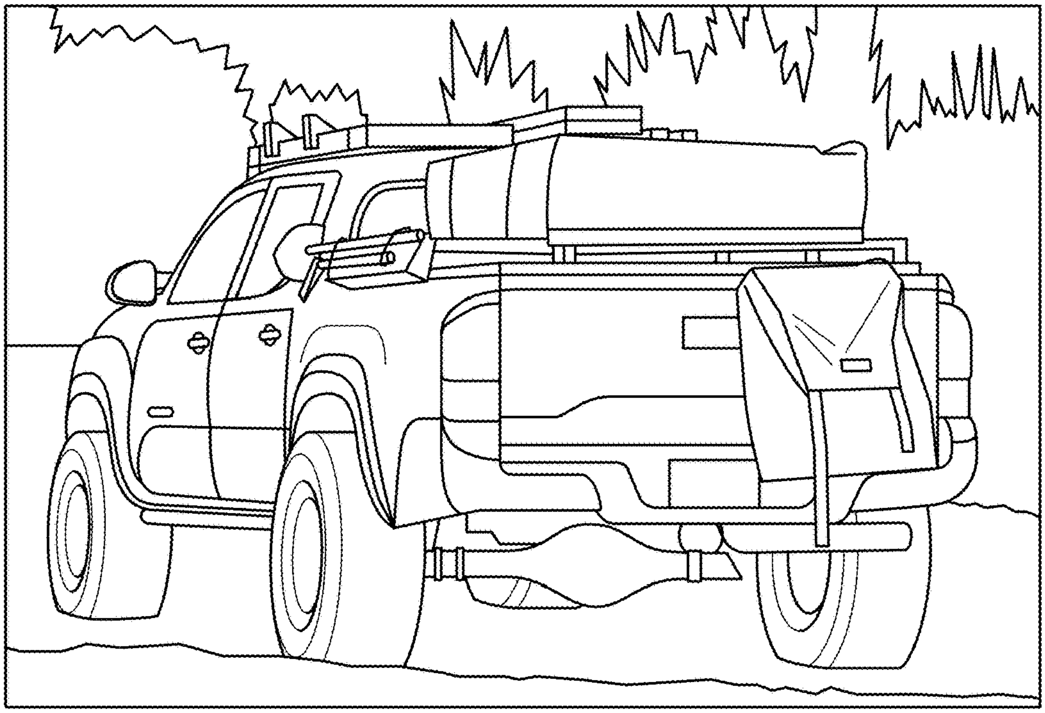

With respect to FIG. 15I, this figure shows a rear perspective view of an illustrative vehicle employing an embodiment of the present invention, with a side panel or molle panel supporting a shovel and other items, and the cross bars supporting a large carrier. As with some other embodiments shown above, this example also illustrates that the present invention provides an efficient structure that can readily accommodate accessories while maintaining desirable airflow, etc.

Figure 15J:
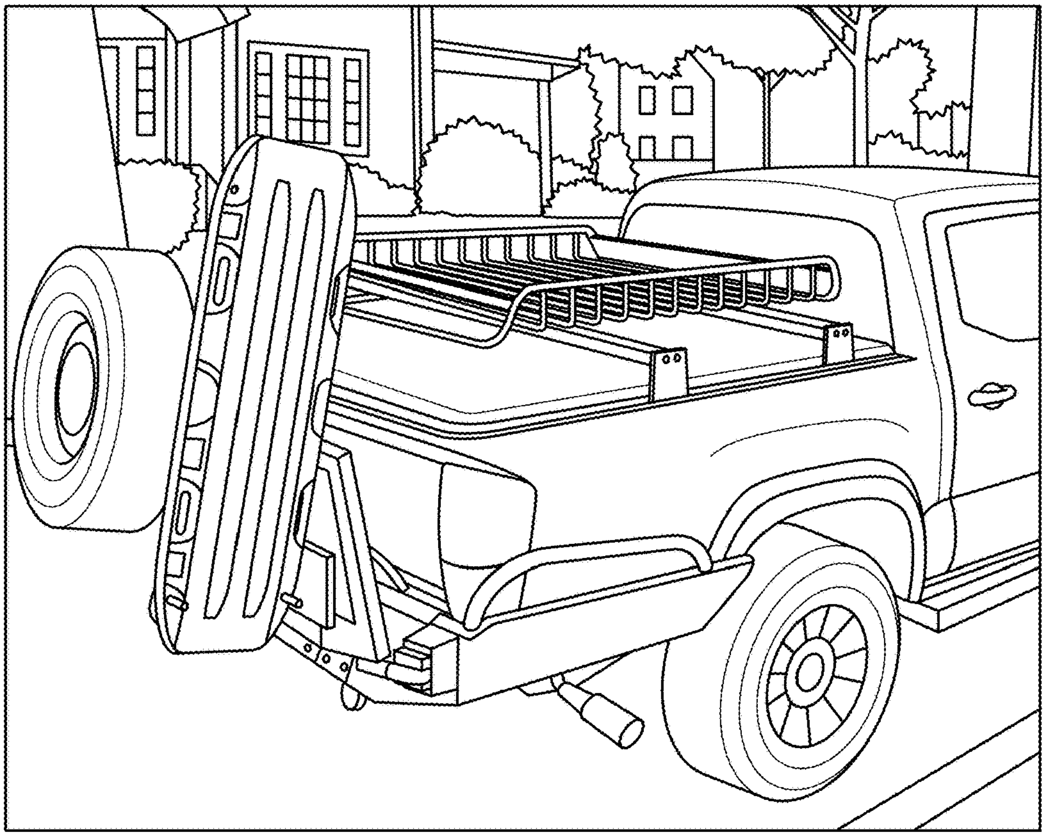

With respect to FIG. 15J, this figure shows another rear perspective view of an illustrative embodiment, in which an embodiment of the present invention is employed, along with a supporting frame or basket structure mounted on the cross-bars 200 according to some illustrative embodiments.

Figure 16A:
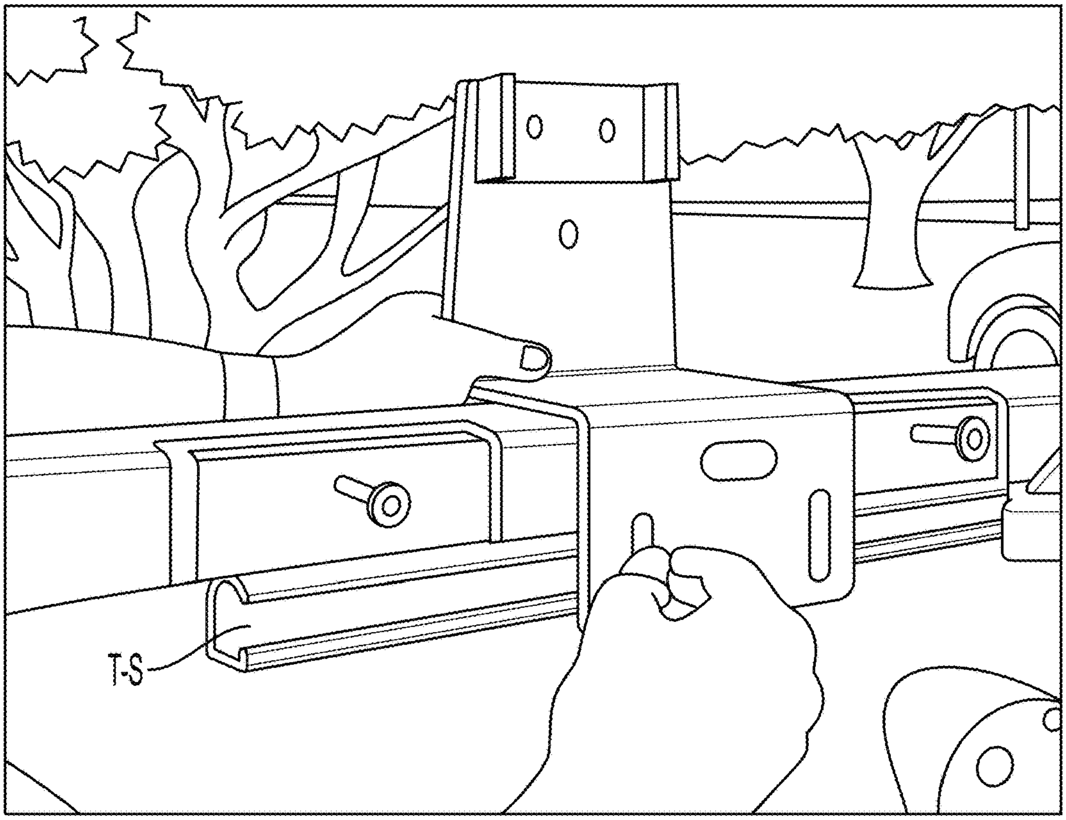
FIGS. 16A and 16B are illustrative pictures showing some illustrative assembly features that can be employed in some illustrative embodiments.
Figure 16B:
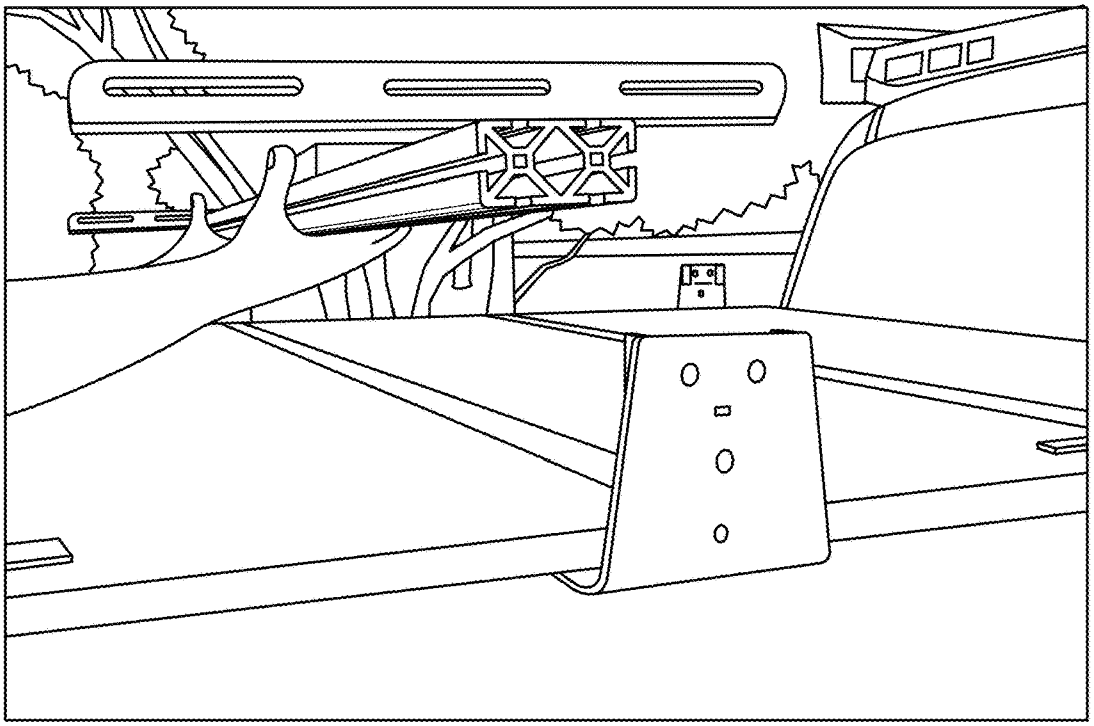

With respect to FIGS. 16A and 16B, these figures show some illustrative assembly features that can be employed in some illustrative embodiments.

With respect to FIG. 16A, in this illustrative figure, a support member 100 is depicted as mounted to the peripheral wall of a vehicle bed by installing a supporting channel member having a T-slot T-S to facilitate attachment of the support member 100 to the vehicle. In this illustrative example, the T-slot can be similar to the functionality of the T-slot of the cross-bars 200, and a user can readily attach the support member to such a channel member having a T-slot T-S along any desired location along the length of the T-slot. Thus, in this illustrative example, in order to mount the support member to the vehicle, another mounting member is first attached to the vehicle and then the support member is attached to the other mounting member to facilitate attachment.

With respect to FIG. 16B, this figure illustrates an illustrative embodiment in which a cross-bar 200 is being mounted by a user on the support members 100. In this illustrative example, the cross-bar has a configuration that is similar to that shown in FIG. 12B. Additionally, in this illustrative embodiment, the cross-bar 200 is depicted with additional accessory supports already pre-attached to the cross-bar. By way of example, the additional accessory support shown proximate the user's right hand can be used to support a tire of a bicycle for supporting of a bicycle.

Further Aspects of Some Preferred Embodiments

According to some preferred embodiments, a light-weight modular mounting system for mounting accessories on vehicles is provided. For example, in some preferred embodiments, a modular mounting system having four support members 100, two cross-bars, can be provided with a total added weight of less than 70 pounds, and in some preferred embodiments, less than 60 pounds, and in some preferred embodiments, less than 50 pounds, or even less than 40 pounds in some embodiments. In some embodiments, a modular mounting system can be provided having a total weight of between about 45 to 50 pounds. In some preferred embodiments, a light-weight modular mounting system can have a static load capacity of greater than 500 pounds, and, in some preferred embodiments, can have a static load capacity of greater than 750 pounds, and, in some preferred embodiments can have a static load capacity of at least about 1000 pounds.

According to some preferred embodiments, a novel and advantageous system and method is provided that enables a vehicle having a rear bed region to be advantageously used by a) enabling the cargo area within the bed region to be used (e.g., for easy access to storage and/or the like within the cargo area), b) enabling a tonneau cover or other cover to be used over the cargo area within the bed region to be used (e.g., enabling the cover to even be opened, closed and/or removed for versatility in use, protection of items in the cargo area from weather, theft and/or other external threats), and c) enabling an area above the cargo area and above the cover to be effectively and conveniently used to mounting additional accessories (e.g., for maximization of capacity and utility of the vehicle without compromising other aspects of use, without adding undue weight and/or the like).

According to some preferred embodiments, the cross-bars 200 include Helicoil™ or other thread inserts to facilitate and optimize performance and/or longevity of threads within the ends of the cross bars to avoid wear, etc.

According to some preferred embodiments, the support members 100 are made with high strength steel. In some embodiments, the support members 100 are coated with a protective coating. For example, in some embodiments, the support members 100 are steel members that are protected (e.g., from corrosion) by a wrinkle powder coating.

According to some preferred embodiments, the cross-bars 200 are made with aluminum. In some embodiments, the cross-bars 200 are anodized aluminum bars. In some embodiments, the cross-bars 200 include one or more T-slot along an upper surface thereof for mounting accessories and the like.

According to some preferred embodiments, the system and method enables the easy mounting of cross-bars 200 closely above a vehicle bed, while concurrently avoiding interference with the operation of the cargo area and the cover of the vehicle bed. Among other things, providing close mounting to the vehicle bed helps to maintain a lower profile of accessories, such as to, e.g., reduce wind drag and the like, helps to maintain rigidity and strength, and/or helps to reduce weight, etc. For example, the structure can help maintain mounted accessories close to the vehicle bed such as to avoid or inhibit exposure of an accessory above the roof of the vehicle.

According to some preferred embodiments, the system and method enables the mounting of a wide variety of accessories, such as, e.g., roof top tents, bicycles, skis & snow-boards, surfboards, lights, antennas and/or any other accessories.

According to some illustrative embodiments, a modular mounting system can include: a) a plurality of cross-bars 200 (e.g., 2 cross-bars in some preferred embodiments), b) two support members 100 (e.g., 2 for each cross-bar in some preferred embodiments), and additional mounting hardware.

In some illustrative embodiments, the cross-bars have a cross-section of about 80 mm wide×40 mm tall (i.e., about 3.15" wide×1.57" tall). However, in other embodiments, the cross-sectional configuration of the cross-bars can be larger or smaller. For example, in some embodiments, the cross bars have a width of less than about 6 inches, or, more preferably, less than about 5 inches, or, more preferably, less than about 4 inches. Moreover, in some embodiments, the cross bards have a height of less than about 4 inches, or, more preferably, less than about 3 inches, or, more preferably, less than about 2 inches.

In some illustrative embodiments, the cross-bars 200 include two upper side T-slots top, two bottom side T-slots, one front side T-slot and one rear side T-slot. In the preferred embodiments, the T-slots run the lengths of the cross-bars. In this manner, the cross-bars provide a wide range of versatility, enabling mounting of accessories along the lengths of the cross-bars, as well as with attachments to all sides of the cross-bars.

In some illustrative embodiments, the support members 100 are made with a sheet of metal, such as, preferably, steel. In some preferred embodiments, the sheet of metal is laser cut, bent with a computer numerically controlled machine (CNC), and welded. Preferably, the support members 100 are coated in a durable wrinkle finish. In some preferred embodiments, the support members are mounted directly to a vehicle bed by being directly attached to the periphery of the vehicle bed (e.g., via bolts or the like) or attached employing at least one further mounting member(s) that is/are attached to the vehicle bed, wherein the support member(s) are attached to the further mounting member(s).

In the preferred embodiments, the system and apparatus enables adjustable (e.g., providing flexibility and versatility) placement of cross-bars 200 along the length of a vehicle bed (e.g., which can be selected as desired). Additionally, in the preferred embodiments, the system and apparatus enables adjustable (e.g., providing flexibility and versatility) placement of the side panels 400 (e.g., in both front-back directions along the length of the bed and up-down directions vertically over the bed). Moreover, in the preferred embodiments, the side panels 400 are angled at a slight tilt angle for ease of use and accessibility.

Broad Scope of the Invention

The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below all stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term “about”, “substantially”, or “approximately”. Thus, recitation of ranges of values herein are merely intended to serve as a shorthand method of referring individually to each separate value falling within the range, unless otherwise indicated herein, and each separate value is incorporated into the specification as if it were individually recited herein. It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A modular mounting system for mounting accessories on vehicles, comprising:

a) a plurality of support members, each of said plurality of support members having a lower section configured to attach to an upper region of a peripheral wall around a vehicle bed at a height below a tonneau cover that extends over the vehicle bed and having an upper section extending to a height above the tonneau cover for support of accessories at a location above said tonneau cover, said support members being configured to allow operation of said tonneau cover without interfering with operation of the tonneau cover; and b) a removable side panel removably and directly attached to a plurality of said upper sections of said plurality of support members.

2. The modular mounting system of claim 1, wherein said support members are formed by bent plate members.

3. The modular mounting system of claim 1, wherein said support members are molded members.

4. The modular mounting system of claim 1, wherein said support members are made of plastic or composite materials.

5. The modular mounting system of claim 1, wherein said support members are made of metal.

6. The modular mounting system of claim 1, wherein said system includes a removable cross-bar removably supported by a plurality of said upper sections of said plurality of support members.

7. The modular mounting system of claim 1, wherein the plurality of support members includes at least two support members along a length of the peripheral wall, wherein the at least two support members are adjustably spaced apart.

8. The modular mounting system of claim 1, wherein an attachment location of said removable side panel relative to said upper sections of said plurality of support members is adjustable.

9. A modular mounting system for mounting accessories on vehicles, comprising:

a) a plurality of support members, each of said plurality of support members having i) a lower upright planar member configured to extend downward along a peripheral wall around a vehicle bed, ii) a cross planar member extending laterally from the lower upright planar member and configured to extend across the peripheral wall around the vehicle bed, and iii) an upper upright planar member extending upwardly from the cross planar member and configured to extend upwardly above a height of the peripheral wall around the vehicle bed; and b) a removable side panel removably and directly attached to a plurality of said upright planar members.

10. The modular mounting system of claim 9, wherein said system includes a removable cross-bar removably supported by a plurality of said upper upright planar members.

11. The modular mounting system of claim 10, wherein said removable cross-bar and said removable side panel are both supported by the same plurality of said upper upright planar members.

12. The modular mounting system of claim 10, wherein said system includes said removable cross-bar removably supported by a plurality of said upper upright planar members, and wherein said cross-bar is an extruded member.

13. The modular mounting system of claim 10, wherein said system includes said removable cross-bar removably supported by a plurality of said upper upright planar members, and wherein said cross-bar is made with extruded aluminum.

14. The modular mounting system of claim 10, further including at least one of the following mounted on said cross bars:

f) a bicycle or motorcycle;
g) a bicycle or motorcycle rack;
h) lawn or construction equipment;
i) tents or other enclosures for human inhabitation; and/or
j) sporting equipment or sporting equipment mounts.

15. The modular mounting system of claim 10, further including at least one of the following mounted on said side panel:

f) a hand tool;
g) a firearm;
h) a board;
i) equipment; and/or
j) a container.

16. The modular mounting system of claim 9, wherein said plurality of support members are made with metal.

17. The modular mounting system of claim 9, wherein said plurality of support members are molded members.

18. The modular mounting system of claim 9, wherein said plurality of support members are made with steel.

19. The modular mounting system of claim 9, wherein the plurality of support members includes at least two support members along a length of the peripheral wall, wherein the at least two support members are adjustably spaced apart.

20. The modular mounting system of claim 9, wherein an attachment location of said removable side panel relative to said upright planar members is adjustable.

21. A method for mounting accessories on vehicles, comprising:

a) mounting a plurality of support members on a peripheral wall of a bed of a vehicle, with each of said plurality of support members having i) a lower upright planar member mounted to extend downward along the peripheral wall around a vehicle bed, ii) a cross planar member extending laterally from the lower upright planar member and extending across the peripheral wall around the vehicle bed, and iii) an upper upright planar member extending upwardly from the cross planar member and extending upwardly above a height of the peripheral wall around the vehicle bed; and b) providing a removable side panel removably and directly attached to a plurality of said upright planar members.

22. The method of claim 21, further including providing a removable cross-bar removably supported by a plurality of said upper upright planar members.

23. The method of claim 22, further including supporting said removable cross-bar and said removable side panel by the same plurality of said upper upright planar members.

24. The method of claim 22, further including forming said cross-bars by extrusion.

25. The method of claim 22, further including forming said cross bars by extruding aluminum.

26. The method of claim 22, further including forming said plurality of support members with metal.

27. The method of claim 22, further including mounting at least one of the following on said cross bars:

g) a bicycle or motorcycle;

h) a bicycle or motorcycle rack;

i) lawn or construction equipment;

j) tents or other enclosures for human inhabitation;

k) a container; and/or l) sporting equipment or sporting equipment mounts.

28. The method of claim 22, further including mounting at least one of the following on said side panels:

f) a hand tool;

g) a firearm;

h) a board;

i) equipment; and/or j) a container.

29. The method of claim 21, further including forming said plurality of support members as molded members.

30. The method of claim 21, further including forming said plurality of support members with molded plastics.

31. The method of claim 21, further including forming said plurality of support members with a composite material.

32. The method of claim 21, further including forming said plurality of support members with steel.

33. The modular mounting system of claim 21, wherein the plurality of support members includes at least two support members along a length of the peripheral wall, wherein the at least two support members are adjustably spaced apart.

34. The modular mounting system of claim 21, wherein an attachment location of said removable side panel relative to said upper sections of said plurality of support members is adjustable.

* * * * *